United States Patent
Wu et al.

(10) Patent No.: US 11,218,193 B2
(45) Date of Patent: Jan. 4, 2022

(54) METHOD AND DEVICE IN UE AND BASE STATION USED FOR WIRELESS COMMUNICATION

(71) Applicants: KeYing Wu, Shanghai (CN); XiaoBo Zhang, Shanghai (CN)

(72) Inventors: KeYing Wu, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 58 days.

(21) Appl. No.: 16/802,595

(22) Filed: Feb. 27, 2020

(65) Prior Publication Data

US 2020/0195312 A1  Jun. 18, 2020

Related U.S. Application Data

(63) Continuation of application No. PCT/CN2017/099961, filed on Aug. 31, 2017.

(51) Int. Cl.
 *H04W 4/00* (2018.01)
 *H04B 7/0404* (2017.01)
 (Continued)

(52) U.S. Cl.
 CPC ......... *H04B 7/0404* (2013.01); *H04B 7/0413* (2013.01); *H04W 72/042* (2013.01); *H04W 72/0453* (2013.01); *H04W 72/1273* (2013.01)

(58) Field of Classification Search
 None
 See application file for complete search history.

(56) References Cited

U.S. PATENT DOCUMENTS

| 11,019,572 B2 * | 5/2021 | Zhang | H04B 7/04 |
| 2008/0232492 A1 * | 9/2008 | Xiao | H04B 7/066 375/260 |

(Continued)

FOREIGN PATENT DOCUMENTS

| CN | 102255643 A | 11/2011 |
| CN | 103634071 A | 3/2014 |

OTHER PUBLICATIONS

ISR received in application No. PCT/CN2017/099961 dated May 16, 2018.

*Primary Examiner* — Phirin Sam

(57) ABSTRACT

A method and a device are provided in a User Equipment (UE) and a base station for wireless communication. The UE receives a first signaling and transmits a first radio signal. The first signaling includes K first field(s) and K second field(s), the K first field(s) is(are) used for determining K first-type vector(s) respectively, and the K first-type vector(s) is(are) one-to-one corresponding to K second-type vector group(s) or K second field(s); a correlation between any one second-type vector in each second-type vector group(s) and a corresponding first-type vector is related to a corresponding second field; the first radio signal includes a second radio signal and a third radio signal; the K first-type vector(s) and the K second-type vector group(s) are used for determining multi-antenna related transmissions of the second radio signal and the third radio signal respectively; the second radio signal and the third radio signal occupy orthogonal frequency-domain resources.

16 Claims, 12 Drawing Sheets

(51) Int. Cl.
*H04B 7/0413* (2017.01)
*H04W 72/04* (2009.01)
*H04W 72/12* (2009.01)

(56) References Cited

U.S. PATENT DOCUMENTS

2009/0052405 A1 2/2009 Ko et al.
2010/0278106 A1* 11/2010 Kim .................. H04W 48/08
 370/328
2015/0304002 A1 10/2015 Baker et al.
2020/0045692 A1* 2/2020 Ko .................... H04B 7/0456

* cited by examiner

METHOD AND DEVICE IN UE AND BASE STATION USED FOR WIRELESS COMMUNICATION

CROSS-REFERENCE TO RELATED APPLICATION

This application is a continuation of International Application No. PCT/CN2017/099961, filed Aug. 31, 2017, the full disclosure of which is incorporated herein by reference.

BACKGROUND

Technical Field

The disclosure relates to transmission methods and devices of radio signals in wireless communication systems, and in particular to a transmission method and device for radio signals in a wireless communication system supporting multi-antenna transmission.

Related Art

In Long Term Evolution (LTE) systems, codebook based precoding is one important approach to achieve multi-antenna transmission, and it plays an important role in both uplink transmission and downlink transmission. In New Radio (NR) systems, the codebook based precoding will be still one of the main technical approaches for multi-antenna transmission.

NR systems will support frequency selective precoding in uplink and downlink transmissions, which brings a new challenge to the design of codebook based precoding scheme.

SUMMARY

The inventor finds through researches that, to support frequency selective precoding in uplink transmission, a base station needs to indicate codeword information of each subband; this approach on one hand increases signaling overheads, and on the other hand causes a problem that a payload size of a downlink control signaling will vary with the number of subbands.

In view of the above problem, the disclosure provides a solution. It should be noted that although the disclosure is initially designed for codebook based uplink precoding, the disclosure is also applicable to other downlink transmissions and other transmission schemes. The embodiments of the UE of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a User Equipment (UE) for wireless communication, wherein the method includes:

receiving a first signaling; and
transmitting a first radio signal.

Herein, the first signaling includes scheduling information of the first radio signal; the first signaling includes K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer.

In one embodiment, the essences of the above method are as follows: each first-type vector or second-type vector represents a precoding vector on one subband, and indexes of the first-type vectors in a codebook are completely indicated by the first fields; the second-type vectors are indicated employing a differential mode, that is, a second field indicates a relationship between a second-type vector and a corresponding first-type vector. The application of the above method has the following benefits: signaling overheads needed by the first signaling may be reduced using a correlation between a channel through which the second radio signal passes and a channel through which the third radio signal passes.

In one embodiment, the scheduling information includes at least one of occupied time-domain resources, occupied frequency-domain resources, a Modulation and Coding Scheme (MCS), a Hybrid Automatic Repeat reQuest (HARD) process number, a Redundancy Version (RV), a New Data Indicator (NDI), occupied antenna ports, a corresponding transmitting beamforming vector or corresponding transmitting spatial filtering.

In one embodiment, the second radio signal and the third radio signal occupy a same time-domain resource.

In one embodiment, the second radio signal and the third radio signal occupy partially overlapping time-domain resources.

In one embodiment, any one of the K first field(s) includes a positive integer number of bit(s).

In one embodiment, any one of the K second field(s) includes a positive integer number of bit(s).

In one embodiment, any two of the K first fields include a same number of bits.

In one embodiment, any two of the K second fields include a same number of bits.

In one embodiment, a number of bits included in any one of the K first field(s) is different from a number of bits included in any one of the K second field(s).

In one embodiment, any one of the K first field(s) includes a Transmitted Precoding Matrix Indicator (TPMI).

In one embodiment, any one of the K first field(s) includes a subband TPMI.

In one embodiment, any one of the K second field(s) includes a positive integer number of TPMI(s).

In one embodiment, any one of the K second field(s) includes a positive integer number of subband TPMI(s).

In one embodiment, the correlation between two vectors refers to: a value obtained by one of the two vectors being multiplied by a conjugate transpose of the other vector of the two vectors, wherein the two vectors are both row vectors.

In one embodiment, the correlation between two vectors refers to: a modulo value of a value obtained by one of the two vectors being multiplied by a conjugate transpose of the other vector of the two vectors, wherein the two vectors are both row vectors.

In one embodiment, the phrase that the K first-type vector(s) is(are) used for determining a multi-antenna related transmission of the second radio signal refers that: the K first-type vector(s) is(are) used for determining a transmitting antenna port group of the second radio signal.

In one subembodiment, one antenna port group includes a positive integer number of antenna port(s).

In one embodiment, the phrase that the K first-type vector(s) is(are) used for determining a multi-antenna related transmission of the second radio signal refers that: the K first-type vector(s) is(are) used for determining transmitting spatial filtering corresponding to the second radio signal.

In one embodiment, the phrase that the K first-type vector(s) is(are) used for determining a multi-antenna related transmission of the second radio signal refers that: the K first-type vector(s) is(are) used as transmitting beamforming vector(s) of the second radio signal respectively.

In one embodiment, the phrase that the K second-type vector group(s) is(are) used for determining a multi-antenna related transmission of the third radio signal refers that: the K second-type vector group(s) is(are) used for determining a transmitting antenna port group of the third radio signal.

In one subembodiment, one antenna port group includes a positive integer number of antenna port(s).

In one embodiment, the phrase that the K second-type vector group(s) is(are) used for determining a multi-antenna related transmission of the third radio signal refers that: the K second-type vector group(s) is(are) used for determining transmitting spatial filtering corresponding to the third radio signal.

In one embodiment, the phrase that the K second-type vector group(s) is(are) used for determining a multi-antenna related transmission of the third radio signal refers that: the second-type vector(s) included in the K second-type vector group(s) is(are) used as transmitting beamforming vector(s) of the third radio signal respectively.

In one embodiment, one antenna port is formed by multiple antennas through antenna virtualization superposition, and mapping coefficients from the multiple antennas to the antenna port form a beamforming vector corresponding to the antenna port.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), a first-type vector corresponding to the given second-type vector group and a second field corresponding to the given second-type vector group are used together for determining the given second-type vector.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), the given second-type vector is a summation of a first-type vector corresponding to the given second-type vector group and an offset vector, and a second field corresponding to the given second-type vector group is used for determining the offset vector.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), the given second-type vector and a first-type vector corresponding to the given second-type vector group both belong to S candidate vectors, a second field corresponding to the given second-type vector group and the first-type vector corresponding to the given second-type vector group are both used for determining the given second-type vector from the S candidate vectors. The S is a positive integer greater than 1.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), a first-type vector corresponding to the given second-type vector group belongs to S candidate vectors, and the given second-type vector belongs to a subset of the S candidate vectors; the first-type vector corresponding to the given second-type vector group is used for determining the subset of the S candidate vectors, a second field corresponding to the given second-type vector group is used for determining the second-type vector from the subset of the S candidate vectors. The S is a positive integer greater than 1.

In one subembodiment, in the given second-type vector group, at least one second-type vector which is not equal to the given second-type vector is used for determining the subset of the S candidate vectors.

In one embodiment, any one of the K first-type vector(s) is one of the S candidate vectors, and the S is a positive integer greater than 1.

In one subembodiment, any one of the K first field(s) indicates an index of a corresponding first-type vector in the S candidate vectors.

In one embodiment, any one second-type vector in the K second-type vector group(s) is one of the S candidate vectors, and the S is a positive integer greater than 1.

In one embodiment, any one of the K first-type vector(s) and any one second-type vector in the K second-type vector group(s) both belong to the S candidate vectors, and the S is a positive integer greater than 1.

In one embodiment, the first signaling is a physical layer signaling.

In one embodiment, the first signaling is a dynamic signaling.

In one embodiment, the first signaling is a dynamic signaling for uplink grant.

In one embodiment, the first signaling is transmitted on a downlink physical layer control channel (that is, a downlink channel capable of carrying physical layer signalings only).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first radio signal is transmitted on an uplink physical layer data channel (that is, an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

According to one aspect of the disclosure, a total number of bits included in the K first field(s) and the K second field(s) is unrelated to a size of frequency-domain resources occupied by the first radio signal.

In one embodiment, the above method has the following benefits: the total number of bits included in the K first field(s) and the K second field(s) is fixed, to avoid that the complexity in blind detection is increased due to a change in a payload size of the first signaling.

In one embodiment, the above method had the following benefits: when a size of frequency-domain resources occupied by the first radio signal changes, the payload size of the first signaling may remain unchanged by adjusting the size of each subband; or, the size of each subband may remain unchanged, while the number of bits included in each second field is adjusted to ensure that the payload size of the first signaling remains unchanged.

In one embodiment, the above method has the following benefits: when the number of subbands increases with the frequency-domain resources occupied by the first radio signal, it is possible to reduce only the number of bits included in the second field and keep the number of bits included in the first field unchanged; this approach only results in loss of precisions of some differential precoding vectors, that is, the second-type vectors, while the precisions of non-differential precoding vectors, that is, the first-type vectors, will not decrease. This method can optimize the performance of transmission while keeping the payload size of the first signaling unchanged.

In one embodiment, the first radio signal occupies a positive integer number of consecutive frequency unit(s) in frequency domain.

In one embodiment, the first radio signal occupies a positive integer number of inconsecutive frequency unit(s) in frequency domain.

In one embodiment, the frequency unit is a bandwidth occupied by one subcarrier.

In one embodiment, the frequency unit is one Resource Block (RB).

In one embodiment, the frequency unit is one Physical Resource Block (PRB).

In one embodiment, the frequency unit consists of a positive integer number of consecutive subcarrier(s).

In one embodiment, a number of bits included in any one of the K first field(s) is unrelated to a size of frequency-resources occupied by the first radio signal.

In one embodiment, the K has a value unrelated to a size of frequency-resources occupied by the first radio signal.

In one embodiment, a number of bits included in any one of the K second field(s) is unrelated to a size of frequency-resources occupied by the first radio signal.

In one embodiment, a number of bits included in any one of the K first field(s) is related to a size of frequency-resources occupied by the first radio signal.

In one embodiment, when the first radio signal occupies W1 frequency units, a number of bits included in any one of the K first field(s) is A1; when the first radio signal occupies W2 frequency units, a number of bits included in any one of the K first field(s) is A2; the W1, the W2, the A1 and the A2 are positive integers respectively, wherein the W1 is greater than the W2, and the A1 is not greater than the A2.

In one embodiment, the K has a value related to a size of frequency-resources occupied by the first radio signal.

In one embodiment, when the first radio signal occupies W1 frequency units, the K has a value of P1; when the first radio signal occupies W2 frequency units, the K has a value of P2; the W1, the W2, the P1 and the P2 are positive integers respectively, wherein the W1 is greater than the W2, and the P1 is not less than the P2.

In one embodiment, a number of bits included in any one of the K second field(s) is related to a size of frequency-resources occupied by the first radio signal.

In one embodiment, when the first radio signal occupies W1 frequency units, a number of bits included in any one of the K second field(s) is B1; when the first radio signal occupies W2 frequency units, a number of bits included in any one of the K second field(s) is B2; the W1, the W2, the B1 and the B2 are positive integers respectively, wherein the W1 is greater than the W2, and the B1 is not greater than the B2.

According to one aspect of the disclosure, the second radio signal includes K second sub-signal(s), and the K first-type vector(s) is(are) used for determining multi-antenna related transmission(s) of the K second sub-signal(s) respectively.

In one embodiment, frequency-domain resources occupied by the K second sub-signals are orthogonal to each other.

In one embodiment, the K second sub-signals occupy a same time-domain resource.

In one embodiment, at least two of the K second sub-signals occupy partially overlapping time-domain resources.

In one embodiment, the phrase that the K first-type vector(s) is(are) used for determining multi-antenna related transmission(s) of the K second sub-signal(s) respectively refers that: the K first-type vector(s) is(are) used for determining transmitting antenna port(s) of the K second sub-signal(s) respectively.

In one embodiment, the phrase that the K first-type vector(s) is(are) used for determining multi-antenna related transmission(s) of the K second sub-signal(s) respectively refers that: the K first-type vector(s) is(are) used for determining transmitting spatial filtering corresponding to the K second sub-signal(s) respectively.

In one embodiment, the phrase that the K first-type vector(s) is(are) used for determining multi-antenna related transmission(s) of the K second sub-signal(s) respectively refers that: the K first-type vector(s) is(are) used as transmitting beamforming vector(s) of the K second sub-signal(s)respectively.

In one embodiment, the phrase that the K first-type vector(s) is(are) used for determining multi-antenna related transmission(s) of the K second sub-signal(s) respectively refers that: the K second sub-signal(s) is(are) transmitted by K antenna port(s) respectively, and beamforming vector(s) corresponding to the K antenna port(s) is(are) the K first-type vector(s) respectively.

In one embodiment, any one of the K second sub-signal(s) occupies a positive integer number of consecutive subcarrier(s) in frequency domain.

In one embodiment, any two of the K second sub-signals occupy frequency-domain resources of a same size.

In one embodiment, a size of frequency-domain resources occupied by any one of the K second sub-signal(s) is unrelated to a size of frequency-domain resources occupied by the first radio signal.

In one embodiment, a size of frequency-domain resources occupied by any one of the K second sub-signal(s) is related to a size of frequency-domain resources occupied by the first radio signal.

In one embodiment, when the first radio signal occupies W1 frequency units, any one of the K second sub-signal(s) occupies V1 frequency units; when the first radio signal occupies W2 frequency units, any one of the K second sub-signal(s) occupies V2 frequency units; the W1, the W2, the V1 and the V2 are positive integers respectively, wherein the W1 is greater than the W2, and the V1 is not less than the V2.

In one embodiment, any two adjacent second sub-signals among the K second sub-signals in frequency domain have an equal frequency spacing there-between.

According to one aspect of the disclosure, the third radio signal includes M third sub-signal(s), the K second-type vector group(s) include(s) M second-type vector(s), the M second-type vector(s) is(are) used for determining multi-antenna related transmission(s) of the M third sub-signal(s) respectively, and the M is a positive integer not less than the K.

In one embodiment, frequency-domain resources occupied by the M third sub-signals are orthogonal to each other.

In one embodiment, the M third sub-signals occupy a same time-domain resource.

In one embodiment, at least two of the M third sub-signals occupy partially overlapping time-domain resources.

In one embodiment, the phrase that the M second-type vector(s) is(are) used for determining multi-antenna related transmission(s) of the M third sub-signal(s) respectively refers that: the M second-type vector(s) is(are) used for determining transmitting antenna port(s) of the M third sub-signal(s) respectively.

In one embodiment, the phrase that the M second-type vector(s) is(are) used for determining multi-antenna related transmission(s) of the M third sub-signal(s) respectively refers that: the M second-type vector(s) is(are) used for determining transmitting spatial filtering corresponding to the M third sub-signal(s) respectively.

In one embodiment, the phrase that the M second-type vector(s) is(are) used for determining multi-antenna related transmission(s) of the M third sub-signal(s) respectively refers that: the M second-type vector(s) is(are) used as transmitting beamforming vector(s) of the M third sub-signal(s)respectively.

In one embodiment, the phrase that the M second-type vector(s) is(are) used for determining multi-antenna related transmission(s) of the M third sub-signal(s) respectively refers that: the M third sub-signal(s) is(are) transmitted by M antenna port(s) respectively, and beamforming vector(s) corresponding to the M antenna port(s) is(are) the M second-type vector(s) respectively.

In one embodiment, any one of the M third sub-signal(s) occupies a positive integer number of consecutive subcarrier(s) in frequency domain.

In one embodiment, any two of the M third sub-signal(s) occupy frequency-domain resources of a same size.

In one embodiment, a size of frequency-domain resources occupied by any one of the M third sub-signal(s) is equal to a size of frequency-domain resources occupied by any one of the K second sub-signal(s).

In one embodiment, a size of frequency-domain resources occupied by any one of the M third sub-signal(s) is unrelated to a size of frequency-domain resources occupied by the first radio signal.

In one embodiment, a size of frequency-domain resources occupied by any one of the M third sub-signal(s) is related to a size of frequency-domain resources occupied by the first radio signal.

In one embodiment, when the first radio signal occupies W1 frequency units, any one of the M third sub-signal(s) occupies V3 frequency units; when the first radio signal occupies W2 frequency units, any one of the M third sub-signal(s) occupies V4 frequency units; the W1, the W2, the V3 and the V4 are positive integers respectively, wherein the W1 is greater than the W2, and the V3 is not less than the V4.

According to one aspect of the disclosure, any one of the K second field(s) includes a positive integer number of second subfield(s), the K second field(s) include(s) M second subfield(s), and the M second subfield(s) is(are) used for determining the M second-type vector(s) respectively In one embodiment, any two of the K second fields include a same number of second subfields.

In one embodiment, a number of second subfields included in any one of the K second field(s) is equal to the M divided by the K, wherein the M is a positive integer multiple of the K.

In one embodiment, at least two of the K second fields include different numbers of second subfields.

In one embodiment, the M is a positive integer multiple of the K.

In one embodiment, any one second subfield in the K second field(s) includes a positive integer number of bit(s).

In one embodiment, any two second subfields in the K second field(s) include a same number of bits.

In one embodiment, a number of bits included in any one second subfield in the K second field(s) is less than a number of bits included in any one of the K first field(s).

In one embodiment, a number of bits included in any one second subfield in the K second field(s) is related to a size of frequency-domain resources occupied by the first radio signal.

In one embodiment, when the first radio signal occupies W1 frequency units, a number of bits included in any one second subfield in the K second field(s) is B3; when the first radio signal occupies W2 frequency units, a number of bits included in any one second subfield in the K second field(s) is B4; the W1, the W2, the B3 and the B4 are positive integers respectively, wherein the W1 is greater than the W2, and the B3 is not greater than the B4.

In one embodiment, the M has a value unrelated to a size of frequency-domain resources occupied by the first radio signal.

In one embodiment, the M has a value related to a size of frequency-domain resources occupied by the first radio signal.

In one embodiment, when the first radio signal occupies W1 frequency units, the M has a value of P3; when the first radio signal occupies W2 frequency units, the M has a value of P4; the W1, the W2, the P3 and the P4 are positive integers respectively, wherein the W1 is greater than the W2, and the P3 is not less than the P4.

In one embodiment, for any one given second-type vector in any one given second-type vector group of the K second-type vector group(s), the given second-type vector belongs to S1 candidate vector(s), the S1 candidate vector(s) is(are) a subset of S candidate vectors, a first-type vector corresponding to the given second-type vector group is used for determining the S1 candidate vector(s) from the S candidate vectors, a second subfield corresponding to the given second-type vector is used for determining the given second-type vector from the S1 candidate vector(s). The S is a positive integer greater than 1, and the S1 is a positive integer less than the S.

In one subembodiment, a second subfield corresponding to the given second-type vector indicates an index of the given second-type vector in the S1 candidate vector(s).

In one embodiment, any one second subfield in the K second field(s) includes a TPMI.

In one embodiment, any one second subfield in the K second field(s) includes a subband TPMI.

In one embodiment, any one second subfield in the K second field(s) includes a PMI.

In one embodiment, any one second subfield in the K second field(s) includes a subband PMI.

In one embodiment, any one second subfield in the K second field(s) includes an SRI.

In one embodiment, any one second subfield in the K second field(s) includes a subband SRI.

According to one aspect of the disclosure, the method include:

receiving downlink information.

Herein, the downlink information is used for determining at least one of the K, a total number of bits included in the K first field(s) and the K second field(s), or a position (positions) of frequency-domain resources occupied by the second radio signal in frequency-domain resources occupied by the first radio signal.

In one embodiment, the downlink information indicates explicitly at least one of the K, a total number of bits included in the K first field(s) and the K second field(s), or a position(positions) of frequency-domain resources occupied by the second radio signal in frequency-domain resources occupied by the first radio signal.

In one embodiment, the downlink information indicates implicitly at least one of the K, a total number of bits included in the K first field(s) and the K second field(s), or a position(positions) of frequency-domain resources occupied by the second radio signal in frequency-domain resources occupied by the first radio signal.

In one embodiment, the downlink information is carried by the first signaling.

In one embodiment, the downlink information is carried by a higher layer signaling.

In one embodiment, the downlink information is carried by an RRC signaling.

In one embodiment, the downlink information is carried by a Medium Access Control layer Control Element (MACCE) signaling.

In one embodiment, the downlink information includes one or more of an SRI, a Rank Indicator (RI), a subcarrier spacing corresponding to the first radio signal or a size of frequency-domain resources occupied by the first radio signal.

In one embodiment, the downlink information is used for determining a size of frequency-domain resources occupied by any one of the K second sub-signal(s).

In one embodiment, any two adjacent second sub-signals among the K second sub-signals in frequency domain have an equal frequency spacing there-between.

In one embodiment, frequency-domain resources occupied by the K second sub-signal(s) have a default (no configuration is needed) start position in frequency-domain resources occupied by the first radio signal.

The disclosure provides a method in a base station for wireless communication, wherein the method includes:

transmitting a first signaling; and receiving a first radio signal.

Herein, the first signaling includes scheduling information of the first radio signal; the first signaling includes K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer.

According to one aspect of the disclosure, a total number of bits included in the K first field(s) and the K second field(s) is unrelated to a size of frequency-domain resources occupied by the first radio signal.

According to one aspect of the disclosure, the second radio signal includes K second sub-signal(s), and the K first-type vector(s) is(are) used for determining multi-antenna related transmission(s) of the K second sub-signal(s) respectively.

According to one aspect of the disclosure, the third radio signal includes M third sub-signal(s), the K second-type vector group(s) include(s) M second-type vector(s), the M second-type vector(s) is(are) used for determining multi-antenna related transmission(s) of the M third sub-signal(s) respectively, and the M is a positive integer not less than the K.

According to one aspect of the disclosure, any one of the K second field(s) includes a positive integer number of second subfield(s), the K second field(s) include(s) M second subfield(s), and the M second subfield(s) is(are) used for determining the M second-type vector(s) respectively.

According to one aspect of the disclosure, the method includes:

transmitting downlink information.

Herein, the downlink information is used for determining at least one of the K, a total number of bits included in the K first field(s) and the K second field(s), or a position (positions) of frequency-domain resources occupied by the second radio signal in frequency-domain resources occupied by the first radio signal.

The disclosure provides a UE for wireless communication, wherein the UE includes:

a first receiver, to receive a first signaling; and a first transmitter, to transmit a first radio signal.

Herein, the first signaling includes scheduling information of the first radio signal; the first signaling includes K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used for determining a multi-antenna related transmission of the second radio signal, and the K second-type vector group(s)

is(are) used for determining a multi-antenna related transmission of the third radio signal; the second radio signal and the third radio signal occupy orthogonal frequency-domain resources; and the K is a positive integer.

In one embodiment, the above UE for wireless communication is characterized in that: a total number of bits included in the K first field(s) and the K second field(s) is unrelated to a size of frequency-domain resources occupied by the first radio signal.

In one embodiment, the above UE for wireless communication is characterized in that: the second radio signal includes K second sub-signal(s), and the K first-type vector(s) is(are) used for determining multi-antenna related transmission(s) of the K second sub-signal(s) respectively.

In one embodiment, the above UE for wireless communication is characterized in that: the third radio signal includes M third sub-signal(s), the K second-type vector group(s) include(s) M second-type vector(s), the M second-type vector(s) is(are) used for determining multi-antenna related transmission(s) of the M third sub-signal(s) respectively, and the M is a positive integer not less than the K;

In one embodiment, the above UE for wireless communication is characterized in that: any one of the K second field(s) includes a positive integer number of second subfield(s), the K second field(s) include(s) M second subfield(s), and the M second subfield(s) is(are) used for determining the M second-type vector(s) respectively.

In one embodiment, the above UE for wireless communication is characterized in that: the first receiver receives downlink information; wherein the downlink information is used for determining at least one of the K, a total number of bits included in the K first field(s) and the K second field(s), or a position(positions) of frequency-domain resources occupied by the second radio signal in frequency-domain resources occupied by the first radio signal.

The disclosure provides a base station for wireless communication, wherein the base station includes:
  a second transmitter, to transmit a first signaling; and
  a second receiver, to receive a first radio signal.

Herein, the first signaling includes scheduling information of the first radio signal; the first signaling includes K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer.

In one embodiment, the above base station for wireless communication is characterized in that: a total number of bits included in the K first field(s) and the K second field(s) is unrelated to a size of frequency-domain resources occupied by the first radio signal.

In one embodiment, the above base station for wireless communication is characterized in that: the second radio signal includes K second sub-signal(s), and the K first-type vector(s) is(are) used for determining multi-antenna related transmission(s) of the K second sub-signal(s) respectively.

In one embodiment, the above base station for wireless communication is characterized in that: the third radio signal includes M third sub-signal(s), the K second-type vector group(s) include(s) M second-type vector(s), the M second-type vector(s) is(are) used for determining multi-antenna related transmission(s) of the M third sub-signal(s) respectively, and the M is a positive integer not less than the K.

In one embodiment, the above base station for wireless communication is characterized in that: any one of the K second field(s) includes a positive integer number of second subfield(s), the K second field(s) include(s) M second subfield(s), and the M second subfield(s) is(are) used for determining the M second-type vector(s) respectively.

In one embodiment, the above base station for wireless communication is characterized in that: the second transmitter further transmits downlink information; wherein the downlink information is used for determining at least one of the K, a total number of bits included in the K first field(s) and the K second field(s), or a position(positions) of frequency-domain resources occupied by the second radio signal in frequency-domain resources occupied by the first radio signal.

In one embodiment, compared with conventional schemes, the disclosure has the following advantages.

In the codebook-based frequency-selective precoding transmission, for precoding vectors on partial subbands, their indexes in a codebook are indicated completely; for precoding vectors on the rest subbands, their indexes are indicated using a differential method, that is, a relationship between it and a given precoding vector is indicated. This method reduces signaling overheads needed by the codebook-based frequency-selective precoding transmission, using a channel correlation between different subbands.

The total number of bits indicated by the codewords for frequency-selective precoding is fixed, thereby avoiding additional complexity of blind detection caused by the payload size of the downlink control signaling varying with the size of scheduled frequency resources.

When the number of subbands changes, it is possible to only adjust the number of bits indicating each differential precoding vector and keep the number of bits indicating each non-differential precoding vector unchanged; this approach only affects the precisions of differential precoding vectors, and keeps the precisions of the non-differential precoding vectors unchanged. This method optimizes the performance of transmission while keeping the payload size of the downlink control signaling unchanged.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

Embodiment 1

Figure 1:
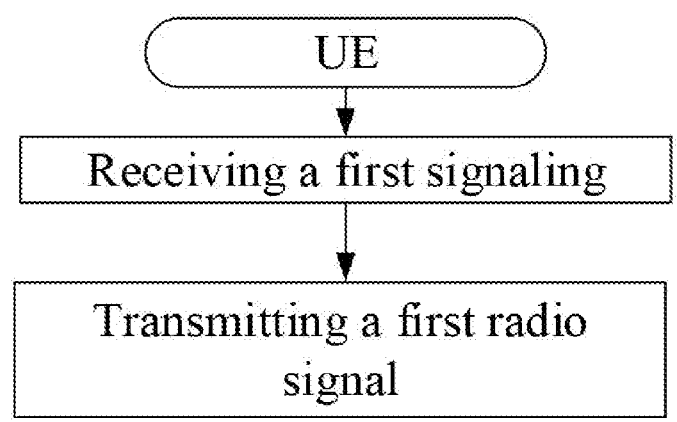
FIG. 1 is a flowchart of a first signaling and a first radio signal according to one embodiment of the disclosure.

Embodiment 1 illustrates an example of a flowchart of a first signaling and a first radio signal, as shown in FIG. 1.

In Embodiment 1, the UE in the disclosure first receives a first signaling, and then transmits a first radio signal. The first signaling includes scheduling information of the first radio signal; the first signaling includes K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer.

In one embodiment, the scheduling information includes at least one of occupied time-domain resources, occupied frequency-domain resources, an MCS, a HARQ process number, an RV, an NDI, occupied antenna ports, a corresponding transmitting beamforming vector or corresponding transmitting spatial filtering.

In one embodiment, the second radio signal and the third radio signal occupy a same time-domain resource.

In one embodiment, the second radio signal and the third radio signal occupy partially overlapping time-domain resources.

In one embodiment, the second radio signal occupies a positive integer number of consecutive subcarrier(s) in frequency domain.

In one embodiment, the second radio signal occupies a positive integer number of inconsecutive subcarrier(s) in frequency domain.

In one embodiment, the third radio signal occupies a positive integer number of consecutive subcarrier(s) in frequency domain.

In one embodiment, the third radio signal occupies a positive integer number of inconsecutive subcarrier(s) in frequency domain.

In one embodiment, for a given size of frequency-domain resources occupied by the first radio signal, frequency-domain resources occupied by the second radio signal have default positions (no configuration is needed) in the frequency-domain resources occupied by the first radio signal.

In one embodiment, for a given size of frequency-domain resources occupied by the first radio signal, frequency-domain resources occupied by the second radio signal have preconfigured positions in the frequency-domain resources occupied by the first radio signal.

In one embodiment, frequency-domain resources occupied by the second radio signal have preconfigured positions in frequency-domain resources occupied by the first radio signal.

In one embodiment, any one of the K first field(s) includes a positive integer number of bit(s).

In one embodiment, any one of the K second field(s) includes a positive integer number of bit(s).

In one embodiment, any two of the K first fields include a same number of bits.

In one embodiment, any two of the K second fields include a same number of bits.

In one embodiment, at least two of the K second fields include different numbers of bits.

In one embodiment, a number of bits included in any one of the K first field(s) is different from a number of bits included in any one of the K second field(s).

In one embodiment, any one of the K first field(s) includes a TPMI.

In one embodiment, any one of the K first field(s) includes a subband TPMI.

In one embodiment, any one of the K second field(s) includes a positive integer number of TPMI(s).

In one embodiment, any one of the K second field(s) includes a positive integer number of subband TPMI(s).

In one embodiment, any one of the K first field(s) indicates a TPMI.

In one embodiment, any one of the K second field(s) indicates a positive integer number of TPMI(s).

In one embodiment, the correlation between two vectors refers to: a value obtained by one of the two vectors being multiplied by a conjugate transpose of the other vector of the two vectors, wherein the two vectors are both row vectors.

In one embodiment, the correlation between two vectors refers to: a modulo value of a value obtained by one of the two vectors being multiplied by a conjugate transpose of the other vector of the two vectors, wherein the two vectors are both row vectors.

In one embodiment, the phrase that the K first-type vector(s) is(are) used for determining a multi-antenna related transmission of the second radio signal refers that:

the K first-type vector(s) is(are) used for determining a transmitting antenna port group of the second radio signal.

In one subembodiment, one antenna port group includes a positive integer number of antenna port(s).

In one embodiment, the phrase that the K first-type vector(s) is(are) used for determining a multi-antenna related transmission of the second radio signal refers that: the K first-type vector(s) is(are) used for determining transmitting spatial filtering corresponding to the second radio signal.

In one embodiment, the phrase that the K first-type vector(s) is(are) used for determining a multi-antenna related transmission of the second radio signal refers that: the K first-type vector(s) is(are) used as transmitting beamforming vector(s) of the second radio signal respectively.

In one embodiment, the phrase that the K second-type vector group(s) is(are) used for determining a multi-antenna related transmission of the third radio signal refers that: the K second-type vector group(s) is(are) used for determining a transmitting antenna port group of the third radio signal.

In one subembodiment, one antenna port group includes a positive integer number of antenna port(s).

In one embodiment, the phrase that the K second-type vector group(s) is(are) used for determining a multi-antenna related transmission of the third radio signal refers that: the K second-type vector group(s) is(are) used for determining transmitting spatial filtering corresponding to the third radio signal.

In one embodiment, the phrase that the K second-type vector group(s) is(are) used for determining a multi-antenna related transmission of the third radio signal refers that: the second-type vector(s) included in the K second-type vector group(s) is(are) used as transmitting beamforming vector(s) of the third radio signal respectively.

In one embodiment, one antenna port is formed by multiple antennas through antenna virtualization superposition, and mapping coefficients from the multiple antennas to the antenna port form a beamforming vector corresponding to the antenna port.

In one embodiment, the phrase that the K first-type vector(s) is(are) used for determining a multi-antenna related transmission of the second radio signal refers that: the second radio signal is transmitted by K antenna port(s) respectively, and beamforming vector(s) corresponding to the K antenna port(s) is(are) the K first-type vector(s) respectively.

In one embodiment, the phrase that the K second-type vector group(s) is(are) used for determining a multi-antenna related transmission of the third radio signal refers that: the third radio signal is transmitted by K antenna port group (s) respectively, any one of the K antenna port group(s) includes a positive integer number of antenna port(s), the K antenna port group(s) is(are) one-to-one corresponding to the K second-type vector group(s), beamforming vectors corresponding to all antenna ports included in any one of the K antenna port group(s) are all second-type vectors included in a corresponding second-type vector group.

In one subembodiment, a number of antenna ports included in any one of the K antenna port group(s) is equal to a number of second-type vectors included in a corresponding second-type vector group.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), a first-type vector corresponding to the given second-type vector group and a second field corresponding to the given second-type vector group are used together for determining the given second-type vector.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), the given second-type vector is a summation of a first-type vector corresponding to the given second-type vector group and an offset vector, and a second field corresponding to the given second-type vector group is used for determining the offset vector.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), the given second-type vector and a first-type vector corresponding to the given second-type vector group both belong to S candidate vectors, a second field corresponding to the given second-type vector group and the first-type vector corresponding to the given second-type vector group are both used for determining the given second-type vector from the S candidate vectors. The S is a positive integer greater than 1.

In one embodiment, the phrase that a correlation between any one second-type vector in each of the K second-type vector group(s) and a corresponding first-type vector is related to a corresponding second field refers that: for any one given second-type vector in any one given second-type vector group of the K second-type vector group(s), a first-type vector corresponding to the given second-type vector group belongs to S candidate vectors, and the given second-type vector belongs to a subset of the S candidate vectors; the first-type vector corresponding to the given second-type vector group is used for determining the subset of the S candidate vectors, a second field corresponding to the given second-type vector group is used for determining the second-type vector from the subset of the S candidate vectors. The S is a positive integer greater than 1.

In one subembodiment, in the given second-type vector group, at least one second-type vector which is not equal to the given second-type vector is used for determining the subset of the S candidate vectors.

In one embodiment, any one of the K first-type vector(s) is one of the S candidate vectors, and the S is a positive integer greater than 1.

In one subembodiment, any one of the K first field(s) indicates an index of a corresponding first-type vector in the S candidate vectors.

In one embodiment, any one second-type vector in the K second-type vector group(s) is one of the S candidate vectors, and the S is a positive integer greater than 1.

In one embodiment, for any one given second-type vector in any one given second-type vector group of the K second-type vector group(s), the given second-type vector belongs to S1 candidate vector(s), the S1 candidate vector(s) is(are) a subset of S candidate vectors, a first-type vector corresponding to the given second-type vector group is used for determining the S1 candidate vector(s) from the S candidate vectors, a second field corresponding to the given second-type vector group is used for determining the given second-type vector from the S1 candidate vector(s). The S is a positive integer greater than 1, and the S1 is a positive integer less than the S.

In one subembodiment, any one of the K first-type vector(s) is one of the S candidate vectors.

In one subembodiment, a second field corresponding to the given second-type vector group indicates an index of the given second-type vector in the S1 candidate vector(s).

In one subembodiment, a ratio of the S1 to the S is preconfigured.

In one subembodiment, a ratio of the S1 to the S is default (no configuration is needed).

In one subembodiment, an index of each of the S1 candidate vector(s) in the S candidate vectors is only related to a first-type vector corresponding to the given second-type vector group, and unrelated to other second-type vectors in the given second-type vector group that are not equal to the given second-type vector.

In one subembodiment, an index of the first-type vector corresponding to the given second-type vector group in the S candidate vectors is used for determining an index of each of the S1 candidate vector(s) in the S candidate vectors; the first-type vector corresponding to the given second-type vector group belongs to the S candidate vectors.

In one subembodiment, a relationship between the S1 candidate vector(s) and the first-type vector corresponding to the given second-type vector group is preconfigured.

In one subembodiment, a relationship between the S1 candidate vector(s) and the first-type vector corresponding to the given second-type vector group is default (no configuration is needed).

In one subembodiment, a relationship between an index of the first-type vector corresponding to the given second-type vector group in the S candidate vectors and an index of each of the S1 candidate vector(s) in the S candidate vectors is preconfigured.

In one subembodiment, a relationship between an index of the first-type vector corresponding to the given second-type vector group in the S candidate vectors and an index of each of the S1 candidate vector(s) in the S candidate vectors is default (no configuration is needed).

In one subembodiment, an absolute value of a difference between an index of each of the S1 candidate vector(s) in the S candidate vectors and an index of the first-type vector corresponding to the given second-type vector group in the S candidate vectors is less than a first threshold, and the first threshold is a positive integer.

In one subembodiment, at least one second-type vector in the given second-type vector group that is not equal to the given second-type vector is used for determining the S1 candidate vector(s).

In one subembodiment, a reference second-type vector is used for determining the S1 candidate vector(s), and the reference second-type vector is one second-type vector in the given second-type vector group that is not equal to the given second-type vector.

In one subembodiment, an index of a reference second-type vector in the S candidate vectors is used for determining an index of each of the S1 candidate vector(s) in the S candidate vector(s); and the reference second-type vector is one second-type vector in the given second-type vector group that is not equal to the given second-type vector.

In one embodiment, any one of the K first-type vector(s) and any one second-type vector in the K second-type vector group(s) both belong to the S candidate vectors, and the S is a positive integer greater than 1.

In one embodiment, any one of the K first field(s) includes an SRI and a TPMI.

In one embodiment, any one of the K first field(s) includes a subband SRI and a subband TPMI.

In one embodiment, any one of the K second field(s) includes a positive integer number of SRI(s) and a positive integer number of TPMI(s).

In one embodiment, any one of the K second field(s) includes a positive integer number of subband SRI(s) and a positive integer number of subband TPMI(s).

In one embodiment, any one of the K first field(s) includes a PMI.

In one embodiment, any one of the K first field(s) includes a subband PMI.

In one embodiment, any one of the K second field(s) includes a positive integer number of PMI(s).

In one embodiment, any one of the K second field(s) includes a positive integer number of subband PMI(s).

In one embodiment, any two of the K second-type vector groups include a same number of second-type vectors.

In one embodiment, at least two of the K second-type vector groups include different numbers of second-type vectors.

In one embodiment, any one of the K second-type vector groups includes more than one second-type vector.

In one embodiment, any one of the K second-type vector groups includes one second-type vector.

In one embodiment, at least one of the K second-type vector groups includes more than one second-type vector.

In one embodiment, at least one of the K second-type vector groups includes one second-type vector.

In one embodiment, the first signaling is a physical layer signaling.

In one embodiment, the first signaling is a dynamic signaling.

In one embodiment, the first signaling is a dynamic signaling for uplink grant.

In one embodiment, the first signaling is transmitted on a downlink physical layer control channel (that is, a downlink channel capable of carrying physical layer signalings only).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the first radio signal is transmitted on an uplink physical layer data channel (that is, an uplink channel capable of carrying physical layer data).

In one embodiment, the uplink physical layer data channel is a PUSCH.

In one embodiment, the uplink physical layer data channel is an sPUSCH.

In one embodiment, the uplink physical layer data channel is an NR-PUSCH.

In one embodiment, the uplink physical layer data channel is an NB-PUSCH.

Embodiment 2

Figure 2:
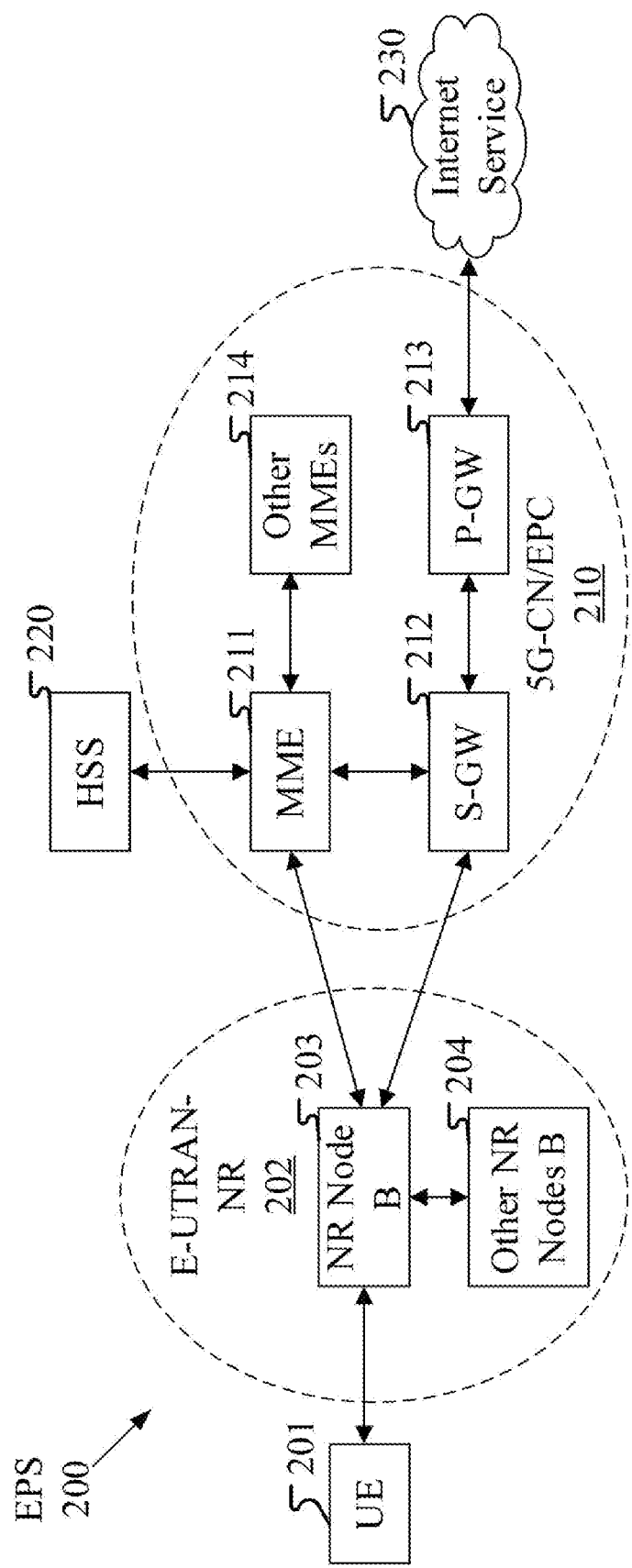
FIG. 2 is a diagram illustrating a network architecture according to one embodiment of the disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one subembodiment, the UE 201 corresponds to the UE in the disclosure.

In one subembodiment, the gNB 203 corresponds to the base station in the disclosure.

Embodiment 3

Figure 3:
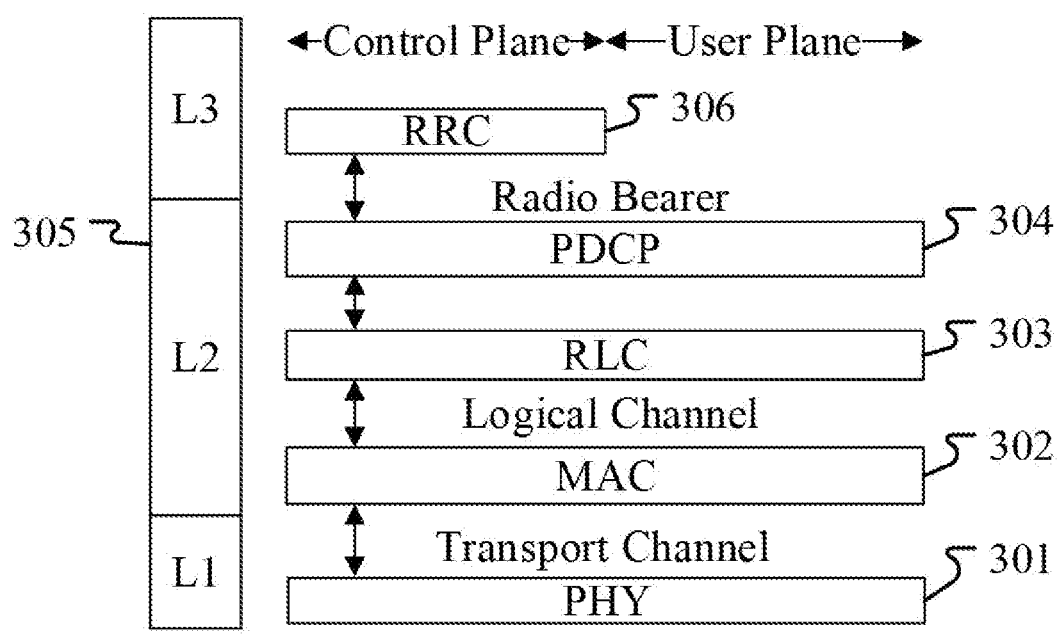
FIG. 3 is a diagram illustrating an embodiment of a radio protocol architecture of a user plane and a control plane according to one embodiment of the disclosure.

Embodiment 3 illustrates an example of a diagram of an embodiment of a radio protocol architecture of a user plane and a control plane, as shown in FIG. 3.

FIG. 3 is a diagram of an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture in FIG. 3 is applicable to the UE in the disclosure.

In one subembodiment, the radio protocol architecture in FIG. 3 is applicable to the base station in the disclosure.

In one subembodiment, the first signaling in the disclosure is generated on the PHY 301.

In one subembodiment, the first radio signal in the disclosure is generated on the PHY 301.

In one subembodiment, the downlink information in the disclosure is generated on the PHY 301.

In one subembodiment, the downlink information in the disclosure is generated on the RRC sublayer 306.

Embodiment 4

Figure 4:
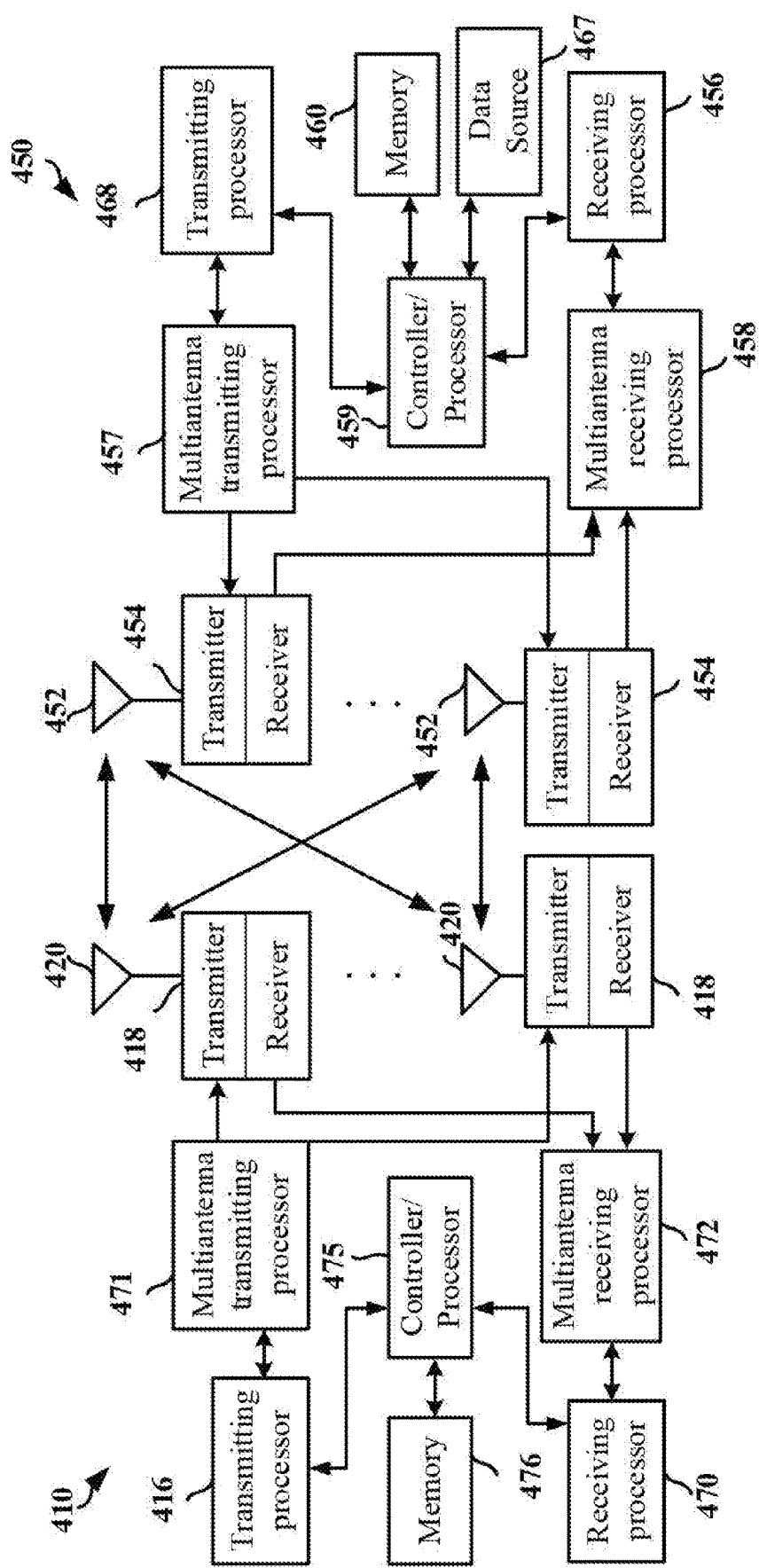
FIG. 4 is a diagram illustrating a New Radio (NR) node and a UE according to one embodiment of the disclosure.

Embodiment 4 illustrates an example of a diagram of an NR node and a UE, as shown in FIG. 4. FIG. 4 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and antenna 452.

In Downlink (DL) transmission, at the gNB 410, a higher-layer packet from a core network is provided to the controller/processor 475. The controller/processor 475 provides a function of a layer 2. In downlink transmission, the controller/processor 475 provides header compression, encryption, packet segmentation and reordering, multiplexing between a logical channel and a transport channel, and a radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for a layer 1 (that is, physical layer). The transmitting processor 416 performs encoding and interleaving so as to ensure a FEC (Forward Error Correction) at the UE 450 side and the mapping to signal clusters corresponding to each modulation scheme (i.e., BPSK, QPSK, M-PSK M-QAM, etc.). The multi-antenna transmitting processor 471 processes the encoded and modulated symbols by a digital spatial precoding/beamforming operation to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In DL transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of the layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In the frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of the layer 2. The controller/processor 459 can be connected to the memory 460 that stores program codes and data. The memory 460 may be called a computer readable media. In DL transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above layer 2, or various control signals can be provided to the layer 3 for processing. The controller/processor 459 can also perform error detection using ACK and/or NACK protocols to support the HARQ operation.

In the Uplink (UL) transmission, at the UE 450, the data source 467 provides a higher-layer packet to the controller/processor 459. The data source 467 represents all protocol layers above the L2 layer. Similar as the transmitting function of the gNB 410 described in DL transmission, the controller/processor 459 provides header compression, encryption, packet segmentation and reordering, and multiplexing between a logical channel and a transport channel based on the radio resource allocation of the base station 410 so as to provide the functions of the layer 2 used for the control plane and user plane. The controller/processor 459 is also in charge of HARQ operation, retransmission of a lost packet, and signaling to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In Uplink (UL) transmission, the function of the gNB 410 is similar as the receiving function of the UE 450 described in the DL transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of the layer 1. The controller/processor 475 provides functions of the layer 2. The controller/processor 475 may be connected to the memory 476 that stores program codes and data. The memory 476 may be called a computer readable media. In UL transmission, the controller/processor 475 provides de-multiplexing between the transport channel and the logical channel, packet reassembling, decryption, header decompression, and control signal processing so as to recover a higher-layer packet coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor.

In one embodiment, the UE 450 includes a memory that stores a computer readable instruction program. The computer readable instruction program generates an action when executed by at least one processor. The action includes: receiving the first signaling in the disclosure, transmitting the first radio signal in the disclosure, and receiving the downlink information in the disclosure.

In one subembodiment, the gNB 410 includes at least one processor and at least one memory. The at least one memory includes computer program codes. The at least one memory and the computer program codes are configured to be used in collaboration with the at least one processor.

In one subembodiment, the gNB 410 includes a memory that stores a computer readable instruction program. The computer readable instruction program generates an action when executed by at least one processor. The action includes: transmitting the first signaling in the disclosure, receiving the first radio signal in the disclosure, and transmitting the downlink information in the disclosure.

In one embodiment, the UE 450 corresponds to the UE in the disclosure.

In one embodiment, the gNB 410 corresponds to the base station in the disclosure.

In one embodiment, at least one of the antenna 452, the receiver 454, the receiving processor 456, the multi-antenna receiving processor 458 or the controller/processor 459 is used for receiving the first signaling; at least one of the antenna 420, the transmitter 418, the transmitting processor 416, the multi-antenna transmitting processor 471 or the controller/processor 475 is used for transmitting the first signaling.

In one embodiment, at least one of the antenna 420, the receiver 418, the receiving processor 470, the multi-antenna receiving processor 472 or the controller/processor 475 is used for receiving the first radio signal; at least one of the antenna 452, the transmitter 454, the transmitting processor 468, the multi-antenna transmitting processor 457 or the controller/processor 459 is used for transmitting the first radio signal.

In one embodiment, at least one of the antenna 452, the receiver 454, the receiving processor 456, the multi-antenna receiving processor 458 or the controller/processor 459 is used for receiving the downlink information; at least one of the antenna 420, the transmitter 418, the transmitting processor 416, the multi-antenna transmitting processor 471 or the controller/processor 475 is used for transmitting the downlink information.

Embodiment 5

Figure 5:
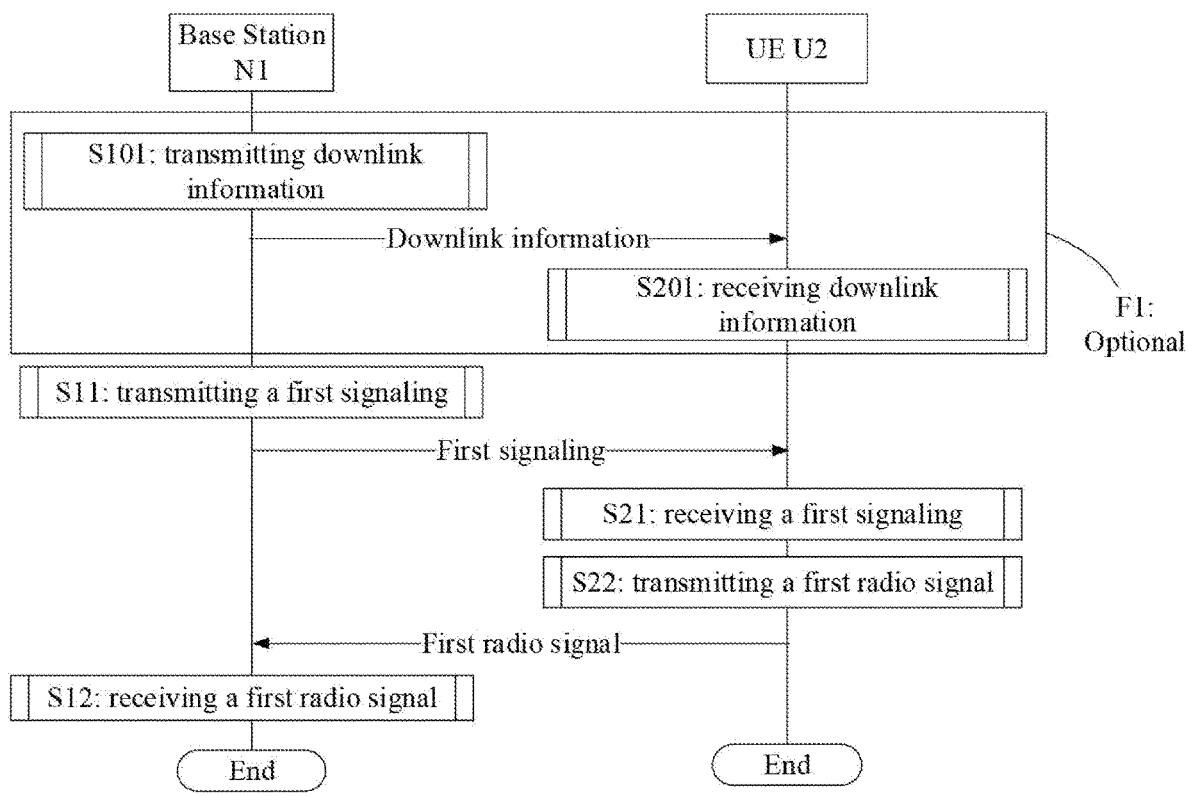
FIG. 5 is a flowchart of wireless transmission according to one embodiment of the disclosure.

Embodiment 5 illustrates an example of a flowchart of wireless transmission, as shown in FIG. 5. In FIG. 5, a base station N1 is a maintenance base station for a serving cell of a UE U2. In FIG. 5, steps in box F1 are optional.

The N1 transmits downlink information in S101, transmits a first signaling in S11, and receives a first radio signal in S12.

The U2 receives downlink information in S201, receives a first signaling in S21, and transmits a first radio signal in 22.

In Embodiment 1, the first signaling includes scheduling information of the first radio signal; the first signaling includes K first field(s) and K second field(s), the K first field(s) is(are) used by the U2 for determining K first-type vector(s), the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used by the U2 for determining a multi-antenna related transmission of the second radio signal, and the K second-type vector group(s) is(are) used by the U2 for determining a multi-antenna related transmission of the third radio signal; the second radio signal and the third radio signal occupy orthogonal frequency-domain resources; and the K is a positive integer. The downlink information is used by the U2 for determining at least one of the K, a total number of bits included in the K first field(s) and the K second field(s), or a position(positions) of frequency-domain resources occupied by the second radio signal in frequency-domain resources occupied by the first radio signal.

In one embodiment, the second radio signal and the third radio signal occupy a same time-domain resource.

In one embodiment, the second radio signal and the third radio signal occupy partially overlapping time-domain resources.

In one embodiment, any one of the K first field(s) includes a positive integer number of bit(s).

In one embodiment, any one of the K second field(s) includes a positive integer number of bit(s).

In one embodiment, any one of the K first field(s) includes a TPMI.

In one embodiment, any one of the K first field(s) includes a subband TPMI.

In one embodiment, any one of the K second field(s) includes a positive integer number of TPMI(s).

In one embodiment, any one of the K second field(s) includes a positive integer number of subband TPMI(s).

In one embodiment, the correlation between two vectors refers to: a value obtained by one of the two vectors being multiplied by a conjugate transpose of the other vector of the two vectors, wherein the two vectors are both row vectors.

In one embodiment, the correlation between two vectors refers to: a modulo value of a value obtained by one of the two vectors being multiplied by a conjugate transpose of the other vector of the two vectors, wherein the two vectors are both row vectors.

In one embodiment, the K first-type vector(s) is(are) used by the U2 as transmitting beamforming vector(s) of the second radio signal respectively.

In one embodiment, the second-type vector(s) included in the K second-type vector group(s) is(are) used by the U2 as transmitting beamforming vector(s) of the third radio signal respectively.

In one embodiment, any one of the K first-type vector(s) and any one second-type vector in the K second-type vector group(s) both belong to S candidate vectors, wherein the S is a positive integer greater than 1.

In one embodiment, the first signaling is a physical layer signaling.

In one embodiment, the first signaling is a dynamic signaling.

In one embodiment, the first signaling is a dynamic signaling for uplink grant.

In one embodiment, the first signaling is transmitted on a downlink physical layer control channel (that is, a downlink channel capable of carrying physical layer signalings only).

In one embodiment, the first radio signal is transmitted on an uplink physical layer data channel (that is, an uplink channel capable of carrying physical layer data).

In one embodiment, a total number of bits included in the K first field(s) and the K second field(s) is unrelated to a size of frequency-domain resources occupied by the first radio signal.

In one embodiment, the second radio signal includes K second sub-signal(s), and the K first-type vector(s) is(are) used by the U2 for determining multi-antenna related transmission(s) of the K second sub-signal(s) respectively.

In one subembodiment, frequency-domain resources occupied by the K second sub-signals are orthogonal to each other.

In one subembodiment, the K first-type vector(s) is(are) used by the U2 as transmitting beamforming vector(s) of the K second sub-signal(s)respectively.

In one subembodiment, any one of the K second sub-signal(s) occupies a positive integer number of consecutive subcarrier(s) in frequency domain.

In one subembodiment, any two of the K second sub-signals occupy frequency-domain resources of a same size.

In one subembodiment, the downlink information is used by the U2 for determining a size of frequency-domain resources occupied by any one of the K second sub-signal(s).

In one subembodiment, any two adjacent second sub-signals among the K second sub-signals in frequency domain have an equal frequency spacing there-between.

In one subembodiment, frequency-domain resources occupied by the K second sub-signal(s) have a default (no configuration is needed) start position in the frequency-domain resources occupied by the first radio signal.

In one embodiment, the third radio signal includes M third sub-signal(s), the K second-type vector group(s) include(s) M second-type vector(s), the M second-type vector(s) is(are) used by the U2 for determining multi-antenna related transmission(s) of the M third sub-signal(s) respectively, and the M is a positive integer not less than the K.

In one subembodiment, frequency-domain resources occupied by the M third sub-signals are orthogonal to each other.

In one subembodiment, the M second-type vector(s) is(are) used by the U2 as transmitting beamforming vector(s) of the M third sub-signal(s)respectively.

In one subembodiment, any one of the M third sub-signal(s) occupies a positive integer number of consecutive subcarrier(s) in frequency domain.

In one subembodiment, any two of the M third sub-signal(s) occupy frequency-domain resources of a same size.

In one embodiment, any one of the K second field(s) includes a positive integer number of second subfield(s), the K second field(s) include(s) M second subfield(s), and the M second subfield(s) is(are) used by the U2 for determining the M second-type vector(s) respectively.

In one subembodiment, a number of second subfields included in any one of the K second field(s) is equal to the M divided by the K, wherein the M is a positive integer multiple of the K.

In one subembodiment, the M is a positive integer multiple of the K.

In one subembodiment, any one second subfield in the K second field(s) includes a positive integer number of bit(s).

In one subembodiment, any two second subfields in the K second field(s) include a same number of bits.

In one subembodiment, any one second subfield in the K second field(s) includes a TPMI.

In one subembodiment, any one second subfield in the K second field(s) includes a subband TPMI.

In one embodiment, the downlink information indicates explicitly at least one of the K, a total number of bits included in the K first field(s) and the K second field(s), or a position(positions) of frequency-domain resources occupied by the second radio signal in frequency-domain resources occupied by the first radio signal.

In one embodiment, the downlink information indicates implicitly at least one of the K, a total number of bits included in the K first field(s) and the K second field(s), or a position(positions) of frequency-domain resources occupied by the second radio signal in frequency-domain resources occupied by the first radio signal.

In one embodiment, the downlink information is carried by the first signaling.

In one embodiment, the downlink information is carried by a higher layer signaling.

In one embodiment, the downlink information is carried by an RRC signaling.

In one embodiment, the downlink information is carried by an MACCE signaling.

In one embodiment, the downlink information includes one or more of an SRI, an RI, a subcarrier spacing corresponding to the first radio signal or a size of frequency-domain resources occupied by the first radio signal.

In one embodiment, box F1 in FIG. 5 does not exist.

In one embodiment, box F1 in FIG. 5 exists.

Embodiment 6

Figure 6:
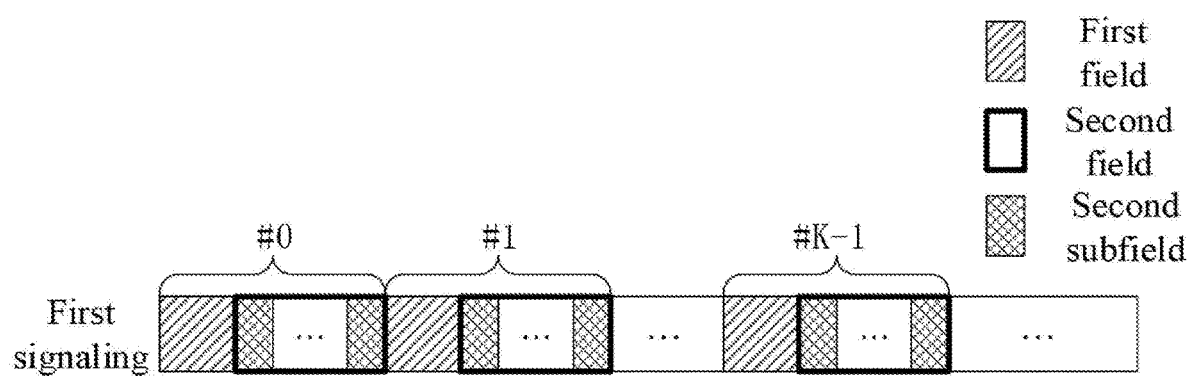
FIG. 6 is a diagram illustrating a first signaling according to one embodiment of the disclosure.

Embodiment 6 illustrates an example of a diagram of a first signaling, as shown in FIG. 6.

In Embodiment 6, the first signaling includes K first fields and K second fields, and any one of the K second fields includes a positive integer number of second subfield(s); any one of the K first fields includes a positive integer number of bit(s); any one of the K second fields includes a positive integer number of bit(s); and any one second subfield in the K second fields includes a positive integer number of bit(s).

In FIG. 6, a grid filled with left slashes represents one of the K first fields, a bold-line grid represents one of the K second fields, a grid filled with cross lines represents one second subfield included in one of the K second fields.

In one embodiment, any two of the K first fields include a same number of bits.

In one embodiment, any two of the K second fields include a same number of bits.

In one embodiment, at least two of the K second fields include different numbers of bits.

In one embodiment, any two of the K second fields include a same number of second subfields.

In one embodiment, a number of second subfields included in any one of the K second fields is equal to M divided by the K, wherein the M is a total number of second subfields included in the K second fields.

In one embodiment, at least two of the K second fields include different numbers of second subfields.

In one embodiment, any two second subfields in the K second fields include a same number of bits.

In one embodiment, a number of bits included in any one second subfield in the K second fields is less than a number of bits included in any one of the K first fields.

In one embodiment, any one of the K first fields indicates a TPMI.

In one embodiment, any one of the K first fields indicates a subband TPMI.

In one embodiment, any one of the K first fields indicates an SRI.

In one embodiment, any one of the K first fields indicates a subband SRI.

In one embodiment, any one of the K first fields indicates a PMI.

In one embodiment, any one of the K first fields indicates a subband PMI.

In one embodiment, any one second subfield in the K second fields indicates a TPMI.

In one embodiment, any one second subfield in the K second fields indicates a subband TPMI.

In one embodiment, any one second subfield in the K second fields indicates an SRI.

In one embodiment, any one second subfield in the K second fields indicates a subband SRI.

In one embodiment, any one second subfield in the K second fields indicates a PMI.

In one embodiment, any one second subfield in the K second fields indicates a subband PMI.

Embodiment 7

Figure 7:
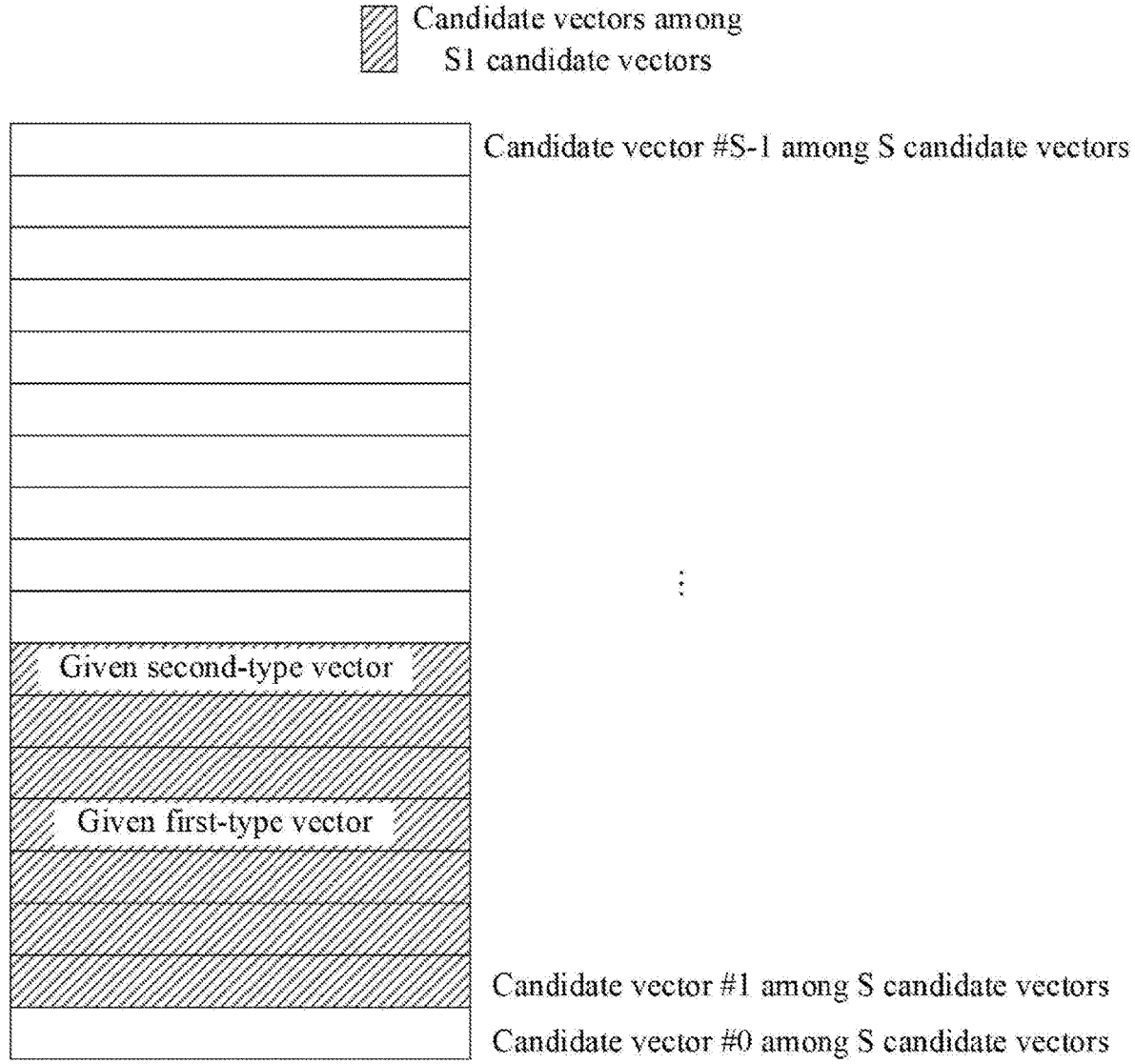
FIG. 7 is a diagram illustrating a relationship between any one given second-type vector in any one given second-type vector group of the K second-type vector group(s) and a corresponding first-type vector according to one embodiment of the disclosure.

Embodiment 7 illustrates an example of a relationship between any one given second-type vector in any one given second-type vector group of the K second-type vector group(s) and a corresponding first-type vector, as shown in FIG. 7.

In Embodiment 7, the K second-type vector group(s) is(are) one-to-one corresponding to the K first-type vector(s) in the disclosure, the K second-type vector group(s) is(are) one-to-one corresponding to the K second field(s) in the disclosure, and the K first-type vector(s) is(are) one-to-one corresponding to the K first field(s) in the disclosure. A correlation between any one given second-type vector in any one given second-type vector group of the K second-type vector group(s) and a given first-type vector is related to a corresponding second field; the given first-type vector is a first-type vector corresponding to the second given second-type vector group. Any one of the K first-type vector(s) is one of S candidate vectors; any one second-type vector in the K second-type vector group(s) is one of the S candidate vectors; and the S is a positive integer greater than 1. The given second-type vector belongs to S1 candidate vector(s), the S1 candidate vector(s) is(are) a subset of the S candidate vectors, the S1 candidate vector(s) include(s) the given first-type vector; the given first-type vector is used for determining the S1 candidate vector(s) from the S candidate vectors, and a second field corresponding to the given second-type vector group is used for determining the given second-type vector from the S1 candidate vector(s). The S1 is a positive integer less than the S.

In one embodiment, any one of the K first field(s) indicates an index of a corresponding first-type vector in the S candidate vectors.

In one embodiment, a second field corresponding to the given second-type vector group indicates an index of the given second-type vector in the S1 candidate vector(s).

In one embodiment, a ratio of the S1 to the S is preconfigured.

In one embodiment, a ratio of the S1 to the S is default (no configuration is needed).

In one embodiment, the downlink information in the disclosure is used for determining a ratio of the S1 to the S.

In one embodiment, an index of each of the S1 candidate vector(s) in the S candidate vectors is only related to the given first-type vector, and unrelated to other second-type vectors in the given second-type vector group that are not equal to the given second-type vector.

In one embodiment, an index of the given first-type vector in the S candidate vectors is used for determining an index of each of the S1 candidate vector(s) in the S candidate vectors.

In one embodiment, a relationship between the S1 candidate vector(s) and the given first-type vector is preconfigured.

In one embodiment, a relationship between the S1 candidate vector(s) and the given first-type vector is default (no configuration is needed).

In one embodiment, the downlink information in the disclosure is used for determining a relationship between the S1 candidate vector(s) and the given first-type vector.

In one embodiment, a relationship between an index of the given first-type vector in the S candidate vectors and an index of each of the S1 candidate vector(s) in the S candidate vectors is preconfigured.

In one embodiment, a relationship between an index of the given first-type vector in the S candidate vectors and an index of each of the S1 candidate vector(s) in the S candidate vectors is default (no configuration is needed).

In one embodiment, the downlink information in the disclosure is used for determining a relationship between an index of the given first-type vector in the S candidate vectors and an index of each of the S1 candidate vector(s) in the S candidate vectors.

In one embodiment, an absolute value of a difference between an index of each of the S1 candidate vector(s) in the S candidate vectors and an index of the given first-type vector in the S candidate vectors is less than a first threshold, and the first threshold is a positive integer.

In one embodiment, any one of the K second field(s) includes a positive integer number of second subfield(s), the K second field(s) totally include(s) M second subfield(s), the K second-type vector group(s) totally include(s) M second-type vector(s), and the M second subfield(s) is(are) used for determining the M second-type vector(s) respectively. The M is a positive integer not less than the K.

In one subembodiment, a second subfield corresponding to the given second-type vector is used for determining the given second-type vector from the S1 candidate vector(s).

In one subembodiment, a second subfield corresponding to the given second-type vector indicates an index of the given second-type vector in the S1 candidate vector(s).

Embodiment 8

Figure 8:
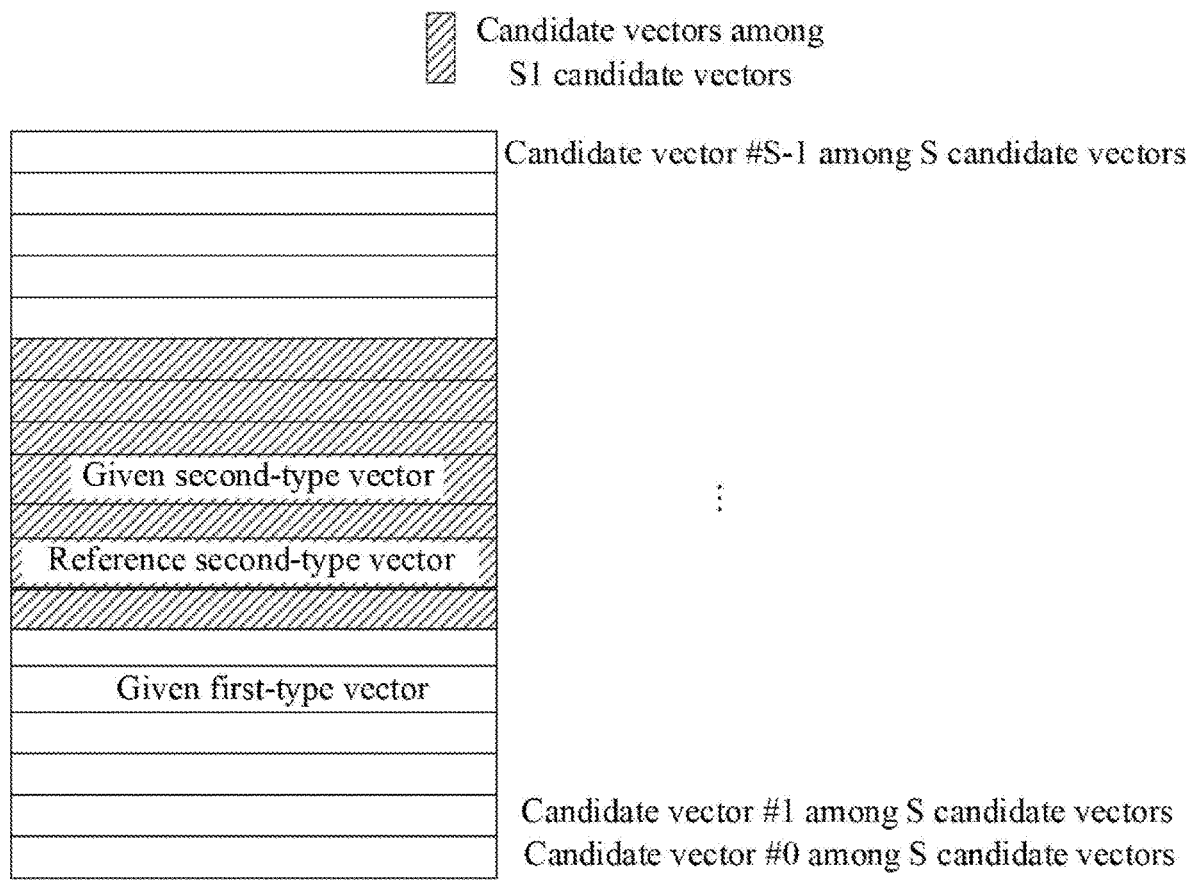
FIG. 8 is a diagram illustrating a relationship between any one given second-type vector in any one given second-type vector group of the K second-type vector group(s) and a corresponding first-type vector according to another embodiment of the disclosure.

Embodiment 8 illustrates an example of a relationship between any one given second-type vector in any one given second-type vector group of the K second-type vector group(s) and a corresponding first-type vector, as shown in FIG. 8.

In Embodiment 8, the K second-type vector group(s) is(are) one-to-one corresponding to the K first-type vector(s) in the disclosure, the K second-type vector group(s) is(are) one-to-one corresponding to the K second field(s) in the disclosure, and the K first-type vector(s) is(are) one-to-one corresponding to the K first field(s) in the disclosure. A correlation between any one given second-type vector in any one given second-type vector group of the K second-type vector group(s) and a given first-type vector is related to a corresponding second field; the given first-type vector is a first-type vector corresponding to the second given second-type vector group. Any one of the K first-type vector(s) is one of S candidate vectors; any one second-type vector in the K second-type vector group(s) is one of the S candidate vectors; and the S is a positive integer greater than 1. The given second-type vector belongs to S1 candidate vector(s), the S1 candidate vector(s) is(are) a subset of the S candidate vectors, the given first-type vector and a reference second-type vector are used for determining the S1 candidate vector(s) from the S candidate vectors, the reference second-type vector is one second-type vector in the given second-type vector group that is not equal to the given second-type vector, and a second field corresponding to the given second-type vector group is used for determining the given second-type vector from the S1 candidate vector(s). The S1 is a positive integer less than the S.

In one embodiment, the given first-type vector and a second field corresponding to the given second-type vector group are used for determining the reference second-type vector from the S candidate vectors.

In one embodiment, the reference second-type vector belongs to a subset of the S candidate vectors, the given first-type vector is used for determining the subset of the S candidate vectors, and a second field corresponding to the given second-type vector group is used for determining the reference second-type vector from the subset of the S candidate vectors.

In one subembodiment, any one of the K second field(s) includes a positive integer number of second subfield(s), the K second field(s) totally include(s) M second subfield(s), the K second-type vector group(s) totally include(s) M second-type vector(s), and the M second subfield(s) is(are) used for determining the M second-type vector(s) respectively. The M is a positive integer not less than the K. A second subfield corresponding to the reference second-type vector is used for determining the reference second-type vector from the subset of the S candidate vectors.

In one subembodiment, a second subfield corresponding to the reference second-type vector indicates an index of the reference second-type vector in the subset of the S candidate vectors.

In one embodiment, an index of the reference second-type vector in the S candidate vectors is used for determining an index of each of the S1 candidate vector(s) in the S candidate vectors.

In one embodiment, a relationship between the S candidate vectors and the reference second-type vector is preconfigured.

In one embodiment, a relationship between the S candidate vectors and the reference second-type vector is default (no configuration is needed).

In one embodiment, the downlink information in the disclosure is used for determining a relationship between the S1 candidate vector(s) and the reference second-type vector.

In one embodiment, a relationship between an index of the reference second-type vector in the S candidate vectors and an index of each of the S1 candidate vector(s) in the S candidate vectors is preconfigured.

In one embodiment, a relationship between an index of the reference second-type vector in the S candidate vectors and an index of each of the S1 candidate vector(s) in the S candidate vectors is default (no configuration is needed).

In one embodiment, the downlink information in the disclosure is used for determining a relationship between an index of the reference second-type vector in the S candidate vectors and an index of each of the S1 candidate vector(s) in the S candidate vectors.

In one embodiment, an absolute value of a difference between an index of each of the S1 candidate vector(s) in the S candidate vectors and an index of the reference second-type vector in the S candidate vectors is less than a first threshold, and the first threshold is a positive integer.

In one embodiment, at least one second-type vector in the given second-type vector group that is not equal to the given second-type vector and the reference second-type vector is used for determining the S1 candidate vector(s).

Embodiment 9

Figure 9:
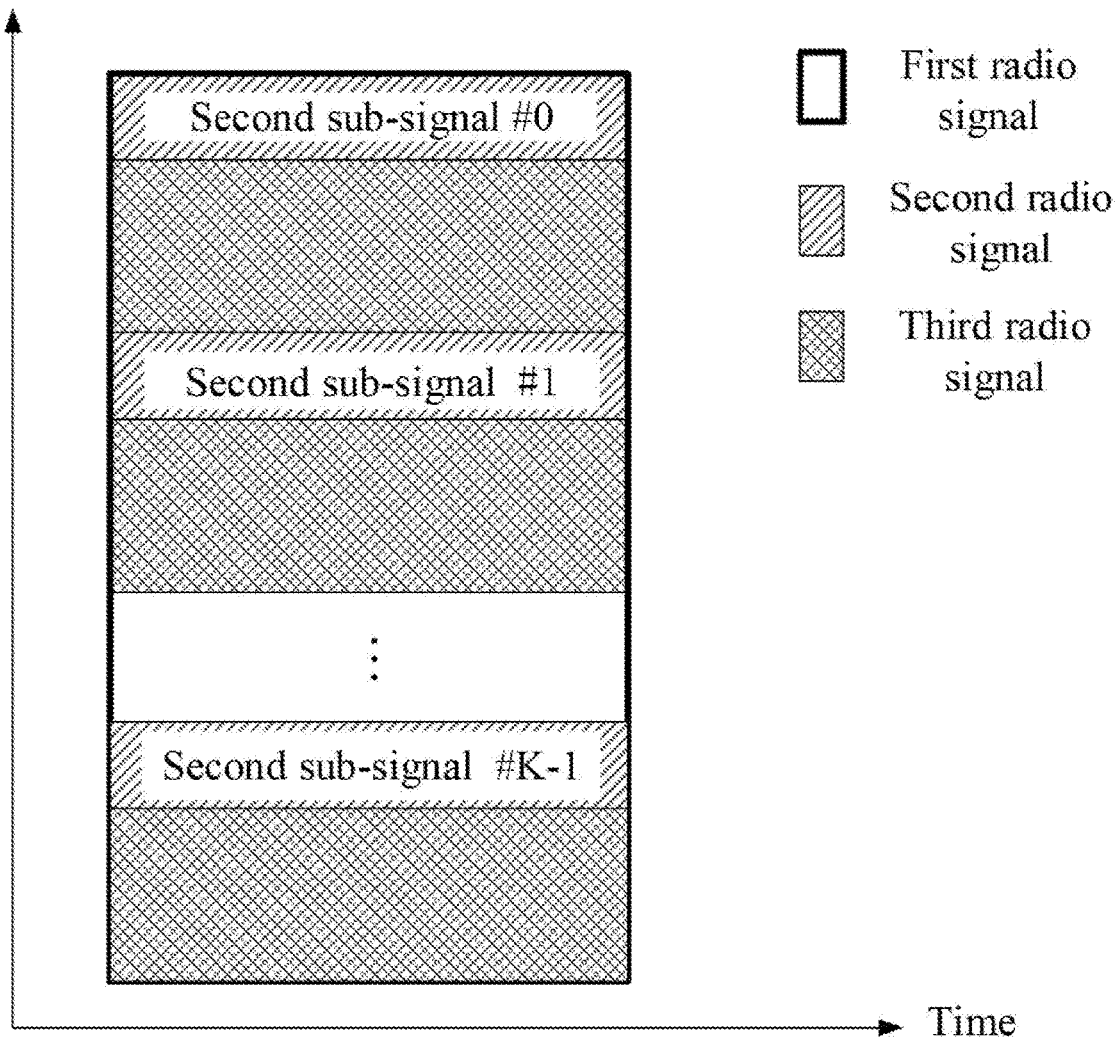
FIG. 9 is a diagram illustrating resource mapping of a second radio signal and a third radio signal in time-frequency domain according to one embodiment of the disclosure.

Embodiment 9 illustrates an example of a diagram of resource mapping of a second radio signal and a third radio signal in time-frequency domain, as shown in FIG. 9.

In FIG. 9, the first radio signal in the disclosure includes the second radio signal and the third radio signal, the second radio signal and the third radio signal occupy orthogonal frequency-domain resources and same time-domain resources. The second radio signal includes K second sub-signals, and the K is a positive integer. Any one of the K second sub-signals occupies a positive integer number of consecutive frequency unit(s), and any two of the K second sub-signals occupy inconsecutive frequency units in frequency domain, as shown in FIG. 9. In FIG. 9, a bold-line grid represents the first radio signal, a grid filled with left slashes represents the second radio signal, and a grid filled with cross lines represents the third radio signal.

In one embodiment, any two of the K second sub-signals occupy frequency-domain resources of a same size.

In one embodiment, any two adjacent second sub-signals among the K second sub-signals in frequency domain have an equal frequency spacing there-between.

In one embodiment, frequency-domain resources occupied by the K second sub-signals have a default start position (no configuration is needed) in frequency-domain resources occupied by the first radio signal.

In one embodiment, for a given size of frequency-domain resources occupied by the first radio signal, frequency-domain resources occupied by the K second sub-signals have default positions (no configuration is needed) in the frequency-domain resources occupied by the first radio signal.

In one embodiment, for a given size of frequency-domain resources occupied by the first radio signal, frequency-domain resources occupied by the K second sub-signals have preconfigured positions in the frequency-domain resources occupied by the first radio signal.

In one embodiment, frequency-domain resources occupied by the K second sub-signals have preconfigured positions in frequency-domain resources occupied by the first radio signal.

In one embodiment, the frequency unit is a bandwidth occupied by one subcarrier.

In one embodiment, the frequency unit is one RB.

In one embodiment, the frequency unit is one PRB.

In one embodiment, the frequency unit consists of a positive integer number of consecutive subcarrier(s).

Embodiment 10

Figure 10:
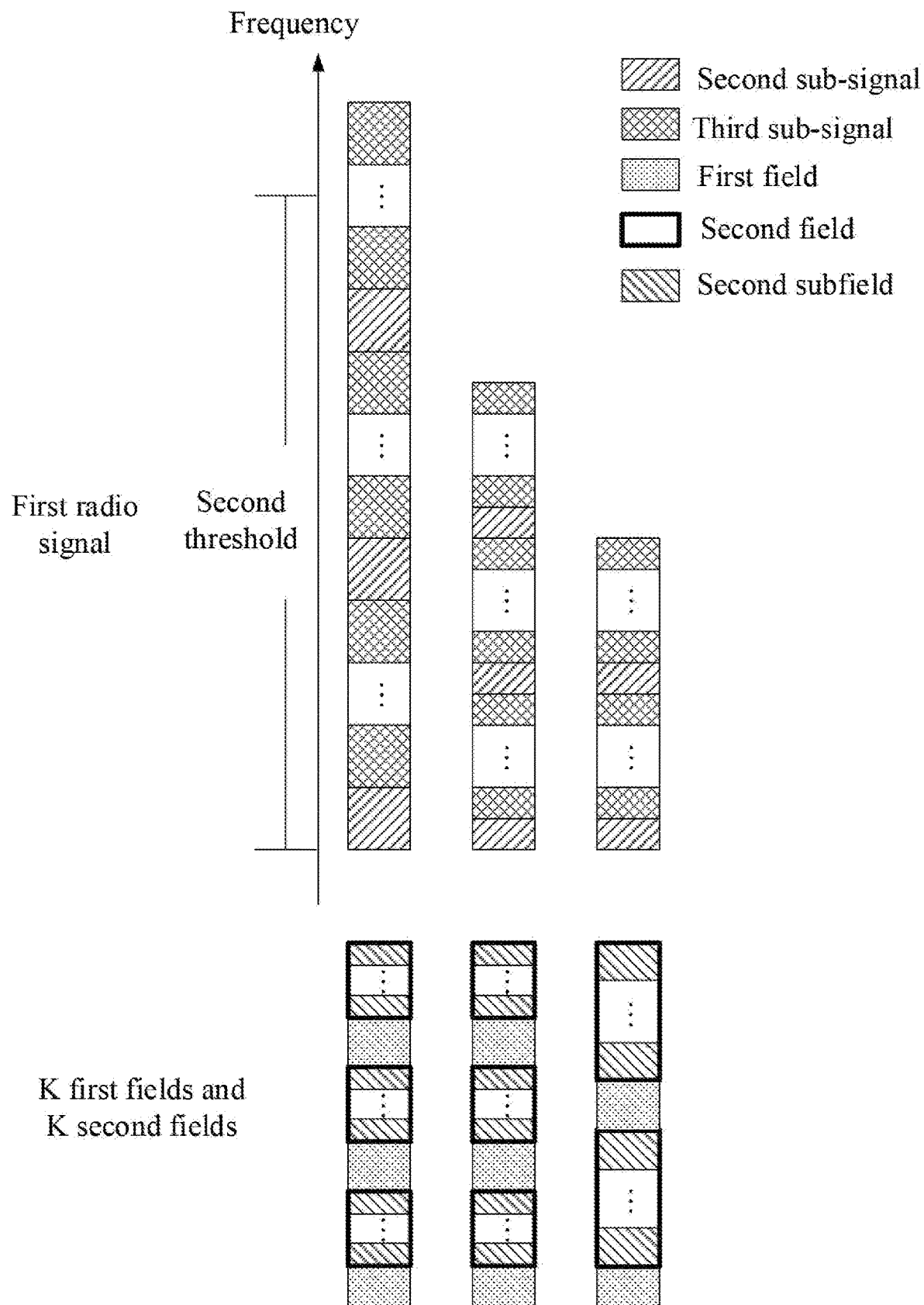
FIG. 10 is a diagram illustrating a relationship between a distribution of K second sub-signals and M third sub-signals in frequency domain, a number of bits included in K first fields and K second fields, and a size of frequency-domain resources occupied by a first radio signal according to one embodiment of the disclosure.

Embodiment 10 illustrates an example of a relationship between a distribution of K second sub-signals and M third sub-signals in frequency domain, a number of bits included in K first fields and K second fields, and a size of frequency-domain resources occupied by a first radio signal, as shown in FIG. 10.

In Embodiment 10, the first radio signal in the disclosure includes the second radio signal and the third radio signal; the second radio signal includes K second sub-signals, and the third radio signal includes M third sub-signals; the K is a positive integer, and the M is a positive integer not less than the K. The first signaling in the disclosure includes K first fields and K second fields, the K first fields are used for determining K first-type vectors respectively, the K first-type vectors are one-to-one corresponding to K second-type vector group(s), and the K second-type vector groups are one-to-one corresponding to the K second fields. A correlation between any one second-type vector in each of the K second-type vector groups and a corresponding first-type vector is related to a corresponding second field. Any one of the K second-type vector groups includes a positive integer number of second-type vector(s), and the K second-type vector groups totally include M second-type vectors; any one of the K second fields includes a positive integer number of second subfield(s), the K second fields totally include M second subfield(s), and the M second subfields are used for determining the M second-type vectors respectively. The K first-type vectors are used for determining multi-antenna related transmissions of the K second sub-signals respectively; the M second-type vectors are used for determining multi-antenna related transmissions of the M third sub-signals respectively. A total number of bits included in the K first fields and the K second fields is unrelated to a size of frequency-domain resources occupied by the first radio signal, and a number of bits included in any one of the K first fields is unrelated to a size of frequency-domain resources occupied by the first radio signal. The second radio signal and the third radio signal occupy orthogonal frequency-domain resources; frequency-domain resources occupied by the K second sub-signals are orthogonal to each other; and frequency-domain resources occupied by the M third sub-signals are orthogonal to each other.

In FIG. 10, a grid filled with left slashes represents one of the K second sub-signals, a grid filled with cross lines represents one of the M third sub-signals, a grid filled with dots represents one of the K first fields, a bold-line grid represents one of the K second fields, and a grid filled with right slashes represents one of the M second subfields.

In one embodiment, when a size of frequency-domain resources occupied by the first radio signal is not greater than a second threshold, a size of frequency-domain resources occupied by any one of the K second sub-signals is unrelated to the size of frequency-domain resources occupied by the first radio signal, and a size of frequency-domain resources occupied by any one of the M third sub-signals is unrelated to the size of frequency-domain resources occupied by the first radio signal; a summation of the K and the M is related to the size of frequency-domain resources occupied by the first radio signal; a number of bits included in any one of the M second subfields is related to the size of frequency-domain resources occupied by the first radio signal. The second threshold is a positive real number.

In one subembodiment, when the first radio signal occupies W1 frequency units, a number of bits included in a target second subfield is B3; when the first radio signal occupies W2 frequency units, a number of bits included in the target second subfield is B4; the W1, the W2, the B3 and the B4 are positive integers respectively, wherein the W1 is greater than the W2, and the B3 is not greater than the B4. The target second subfield is any one second subfield in the K second fields.

In one subembodiment, when the first radio signal occupies W1 frequency units, a summation of the K and the M is equal to Q1; when the first radio signal occupies W2 frequency units, a summation of the K and the M is equal to Q2; the W1, the W2, the Q1 and the Q2 are positive integers respectively, wherein the W1 is greater than the W2, and the Q1 is not less than the Q2.

In one subembodiment, the K has a value related to a size of frequency-resources occupied by the first radio signal.

In one subembodiment, when the first radio signal occupies W1 frequency units, the K has a value of P1; when the first radio signal occupies W2 frequency units, the K has a value of P2; the W1, the W2, the P1 and the P2 are positive integers respectively, wherein the W1 is greater than the W2, and the P1 is not less than the P2.

In one embodiment, when a size of frequency-domain resources occupied by the first radio signal is greater than a second threshold, a size of frequency-domain resources occupied by any one of the K second sub-signals is related to the size of frequency-domain resources occupied by the first radio signal, and a size of frequency-domain resources occupied by any one of the M third sub-signals is related to the size of frequency-domain resources occupied by the first radio signal; a summation of the K and the M is unrelated to the size of frequency-domain resources occupied by the first radio signal; a number of bits included in any one of the M second subfields is unrelated to the size of frequency-domain resources occupied by the first radio signal. The second threshold is a positive real number.

In one subembodiment, when the first radio signal occupies W3 frequency units, a target second sub-signal occupies V1 frequency units; when the first radio signal occupies W4 frequency units, the target second sub-signal occupies V2 frequency units; the W3, the W4, the V1 and the V2 are positive integers respectively, wherein the W1 is greater than the W2, and the V1 is not less than the V2; the target second sub-signal is any one of the K second sub-signals.

In one subembodiment, when the first radio signal occupies W3 frequency units, a target third sub-signal occupies V3 frequency units; when the first radio signal occupies W4 frequency units, the target third sub-signal occupies V4 frequency units; the W3, the W4, the V3 and the V4 are positive integers respectively, wherein the W1 is greater than the W2, and the V3 is not less than the V4; the target third sub-signal is any one of the M third sub-signals.

In one embodiment, any two of the K first fields include a same number of bits.

In one embodiment, any two of the K second fields include a same number of bits.

In one embodiment, any two of the M second sub-fields include a same number of bits.

In one embodiment, a number of bits included in any one of the M second subfields is less than a number of bits included in any one of the K first fields.

In one embodiment, any two of the K second sub-signals occupy frequency-domain resources of a same size.

In one embodiment, any two of the M third sub-signals occupy frequency-domain resources of a same size.

In one embodiment, a size of frequency-domain resources occupied by any one of the M third sub-signals is equal to a size of frequency-domain resources occupied by any one of the K second sub-signals.

Embodiment 11

Figure 11:
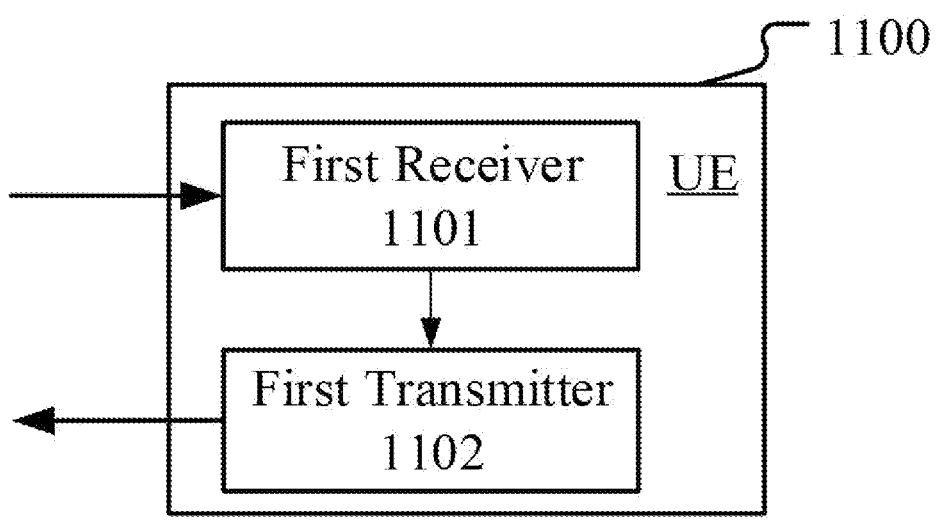
FIG. 11 is a structure block diagram illustrating a processing device in a UE according to one embodiment of the disclosure.

Embodiment 11 illustrates an example of a structure block diagram of a processing device in a UE, as shown in FIG. 11. In FIG. 11, the processing device 1100 in the UE mainly includes a first receiver 1101 and a first transmitter 11020

In Embodiment 11, the first receiver 1101 receives a first signaling, and the first transmitter 1102 transmits a first radio signal.

In Embodiment 11, the first signaling includes scheduling information of the first radio signal; the first signaling includes K first field(s) and K second field(s), the K first field(s) is(are) used by the first transmitter 1102 for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used by the first transmitter 1102 for determining a multi-antenna related transmission of the second radio signal, and the K second-type vector group(s) is(are) used by the first transmitter 1102 for determining a multi-antenna related transmission of the third radio signal; the second radio signal and the third radio signal occupy orthogonal frequency-domain resources; and the K is a positive integer.

In one embodiment, a total number of bits included in the K first field(s) and the K second field(s) is unrelated to a size of frequency-domain resources occupied by the first radio signal.

In one embodiment, the second radio signal includes K second sub-signal(s), and the K first-type vector(s) is(are) used by the first transmitter 1102 for determining multi-antenna related transmission(s) of the K second sub-signal(s) respectively.

In one embodiment, the third radio signal includes M third sub-signal(s), the K second-type vector group(s) include(s) M second-type vector(s), the M second-type vector(s) is(are) used by the first transmitter 1102 for determining multi-antenna related transmission(s) of the M third sub-signal(s) respectively, and the M is a positive integer not less than the K;

In one embodiment, any one of the K second field(s) includes a positive integer number of second subfield(s), the K second field(s) include(s) M second subfield(s), and the M second subfield(s) is(are) used by the first transmitter 1102 for determining the M second-type vector(s) respectively.

In one embodiment, the first receiver receives downlink information; wherein the downlink information is used by at least one of the first receiver 1101 or the first transmitter 1102 for determining at least one of the K, a total number of bits included in the K first field(s) and the K second field(s) or a position(positions) of frequency-domain resources occupied by the second radio signal in frequency-domain resources occupied by the first radio signal.

In one subembodiment, the first receiver 1101 includes at least one of the antenna 452, the receiver 454, the receiving processor 456, the multi-antenna receiving processor 458, the controller/processor 459, the memory 460 or the data source 467 illustrated in Embodiment 4.

In one subembodiment, the first transmitter 1102 includes at least one of the antenna 452, the transmitter 454, the transmitting processor 468, the multi-antenna transmitting processor 467, the controller/processor 469, the memory 460 or the data source 467 illustrated in Embodiment 4.

Embodiment 12

Figure 12:
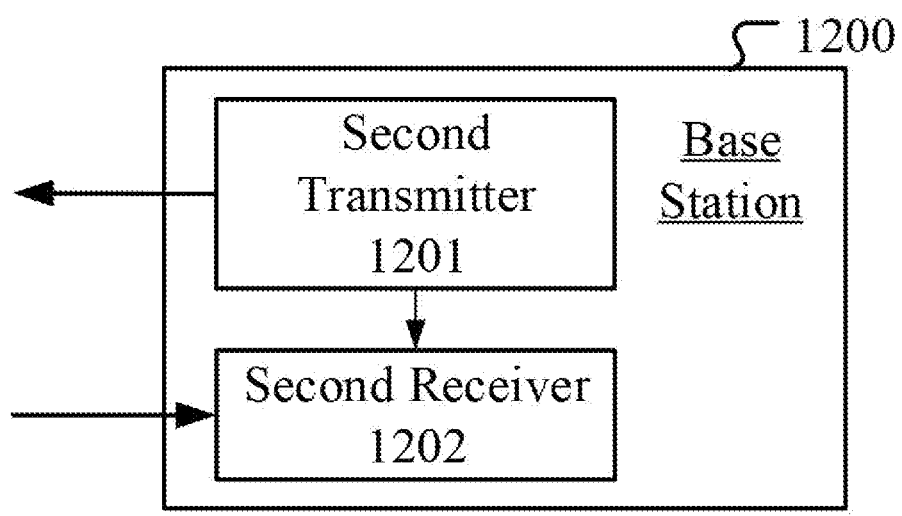
FIG. 12 is a structure block diagram illustrating a processing device in a base station according to one embodiment of the disclosure.

Embodiment 12 illustrates an example of a structure block diagram of a processing device in a base station, as shown in FIG. 12. In FIG. 12, the processing device 1200 in the base station mainly includes a second transmitter 1201 and a second receiver 1202.

In Embodiment 12, the second transmitter 1201 transmits a first signaling, and the second receiver 1202 receives a first radio signal.

In Embodiment 12, the first signaling includes scheduling information of the first radio signal; the first signaling includes K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) includes a positive integer number of second-type vector(s); a correlation between any one second-type vector in each of the K second-type vector group(s) and a corresponding first-type vector is related to a corresponding second field; the first radio signal includes a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer.

In one embodiment, a total number of bits included in the K first field(s) and the K second field(s) is unrelated to a size of frequency-domain resources occupied by the first radio signal.

In one embodiment, the second radio signal includes K second sub-signal(s), and the K first-type vector(s) is(are) used for determining multi-antenna related transmission(s) of the K second sub-signal(s) respectively.

In one embodiment, the third radio signal includes M third sub-signal(s), the K second-type vector group(s) include(s) M second-type vector(s), the M second-type vector(s) is(are) used for determining multi-antenna related transmission(s) of the M third sub-signal(s) respectively, and the M is a positive integer not less than the K.

In one embodiment, any one of the K second field(s) includes a positive integer number of second subfield(s), the K second field(s) include(s) M second subfield(s), and the M second subfield(s) is(are) used for determining the M second-type vector(s) respectively.

In one embodiment, the second transmitter 1201 further transmits downlink information; wherein the downlink information is used for determining at least one of the K, a total number of bits included in the K first field(s) and the K second field(s), or a position(positions) of frequency-domain resources occupied by the second radio signal in frequency-domain resources occupied by the first radio signal.

In one embodiment, the second transmitter 1201 includes at least one of the antenna 420, the transmitter 418, the transmitting processor 416, the multi-antenna transmitting processor 471, the controller/processor 475 or the memory 476 illustrated in Embodiment 4.

In one embodiment, the second receiver 1202 includes at least one of the antenna 420, the receiver 418, the receiving processor 470, the multi-antenna receiving processor 472, the controller/processor 475 or the memory 470 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the present application includes but not limited to macro-cellular base stations, micro-cellular base stations, home base stations, relay base station, gNB, TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
receiving a first signaling; and
transmitting a first radio signal;
wherein the first signaling comprises scheduling information of the first radio signal; the first signaling comprises K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) comprises a positive integer number of second-type vector(s); a correlation between any one second-type vector in each of the K second-type vector group(s) and a corresponding first-type vector is related to a corresponding second field; the first radio signal comprises a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer; a total number of bits comprised in the K first field(s) and the K second field(s) is unrelated to a size of frequency-domain resources occupied by the first radio signal.

2. The method according to claim 1, wherein the second radio signal comprises K second sub-signal(s), and the K first-type vector(s) is(are) used for determining multi-antenna related transmission(s) of the K second sub-signal(s) respectively.

3. The method according to claim 1, wherein the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, and the M is a positive integer not less than the K;

or, the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, the M is a positive integer not less than the K, any one of the K second field(s) comprises a positive integer number of second subfield(s), the K second field(s) comprise(s) M second subfield(s), and the M second subfield(s) is(are) used for determining the M second-type vector(s) respectively.

4. The method according to claim 1, comprising:
receiving downlink information;
wherein the downlink information is used for determining at least one of the K, a total number of bits comprised in the K first field(s) and the K second field(s), or a position(positions) of frequency-domain resources occupied by the second radio signal in frequency-domain resources occupied by the first radio signal.

5. A method in a base station for wireless communication, comprising:
transmitting a first signaling; and
receiving a first radio signal;
wherein the first signaling comprises scheduling information of the first radio signal; the first signaling comprises K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) comprises a positive integer number of second-type vector(s); a correlation between any one second-type vector in each of the K second-type vector group(s) and a corresponding first-type vector is related to a corresponding second field; the first radio signal comprises a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer; a total number of bits comprised in the K first field(s) and the K second field(s) is unrelated to a size of frequency-domain resources occupied by the first radio signal.

6. The method according to claim 5, wherein the second radio signal comprises K second sub-signal(s), and the K first-type vector(s) is(are) used for determining multi-antenna related transmission(s) of the K second sub-signal(s) respectively.

7. The method according to claim 5, wherein the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, and the M is a positive integer not less than the K;

or, the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, the M is a positive integer not less than the K, any one of the K second field(s) comprises a positive integer number of second subfield(s), the K second field(s) comprise(s) M second subfield(s), and the M second subfield(s) is(are) used for determining the M second-type vector(s) respectively.

8. The method according to claim 5, comprising:
transmitting downlink information;
wherein the downlink information is used for determining at least one of the K, a total number of bits comprised in the K first field(s) and the K second field(s), or a position(positions) of frequency-domain resources occupied by the second radio signal in frequency-domain resources occupied by the first radio signal.

9. A UE for wireless communication, comprising:
a first receiver, to receive a first signaling; and
a first transmitter, to transmit a first radio signal;
wherein the first signaling comprises scheduling information of the first radio signal; the first signaling comprises K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) comprises a positive integer number of second-type vector(s); a correlation between any one second-type vector in each of the K second-type vector group(s) and a corresponding first-type vector is related to a corresponding second field; the first radio signal comprises a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer; a total number of bits comprised in the K first field(s) and the K second field(s) is unrelated to a size of frequency-domain resources occupied by the first radio signal.

10. The UE according to claim 9, wherein the second radio signal comprises K second sub-signal(s), and the K first-type vector(s) is(are) used for determining multi-antenna related transmission(s) of the K second sub-signal(s) respectively.

11. The UE according to claim 9, wherein the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, and the M is a positive integer not less than the K;
or, the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, the M is a positive integer not less than the K, any one of the K second field(s) comprises a positive integer number of second subfield(s), the K second field(s) comprise(s) M second subfield(s), and the M second subfield(s) is(are) used for determining the M second-type vector(s) respectively.

12. The UE according to claim 9, wherein the first receiver receives downlink information; wherein the downlink information is used for determining at least one of the K, a total number of bits comprised in the K first field(s) and the K second field(s), or a position(positions) of frequency-domain resources occupied by the second radio signal in frequency-domain resources occupied by the first radio signal.

13. A base station for wireless communication, comprising:
a second transmitter, to transmit a first signaling; and
a second receiver, to receive a first radio signal;
wherein the first signaling comprises scheduling information of the first radio signal; the first signaling comprises K first field(s) and K second field(s), the K first field(s) is(are) used for determining K first-type vector(s) respectively, the K first-type vector(s) is(are) one-to-one corresponding to K second-type vector group(s), the K second-type vector group(s) is(are) one-to-one corresponding to the K second field(s), and any one of the K second-type vector group(s) comprises a positive integer number of second-type vector(s); a correlation between any one second-type vector in each of the K second-type vector group(s) and a corresponding first-type vector is related to a corresponding second field; the first radio signal comprises a second radio signal and a third radio signal; the K first-type vector(s) is(are) used for determining a multi-antenna related transmission of the second radio signal, and the K second-type vector group(s) is(are) used for determining a multi-antenna related transmission of the third radio signal; the second radio signal and the third radio signal occupy orthogonal frequency-domain resources; and the K is a positive integer; a total number of bits comprised in the K first field(s) and the K second field(s) is unrelated to a size of frequency-domain resources occupied by the first radio signal.

14. The base station according to claim 13, wherein the second radio signal comprises K second sub-signal(s), and the K first-type vector(s) is(are) used for determining multi-antenna related transmission(s) of the K second sub-signal(s) respectively.

15. The base station according to claim 13, wherein the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, and the M is a positive integer not less than the K;
or, the third radio signal comprises M third sub-signal(s), the K second-type vector group(s) comprise(s) M second-type vector(s), the M second-type vector(s) is(are) used for determining multi-antenna related transmission(s) of the M third sub-signal(s) respectively, the M is a positive integer not less than the K, any one of the K second field(s) comprises a positive integer number of second subfield(s), the K second field(s) comprise(s) M second subfield(s), and the M second subfield(s) is(are) used for determining the M second-type vector(s) respectively.

16. The base station according to claim 13, wherein the second transmitter transmits downlink information; wherein the downlink information is used for determining at least one of the K, a total number of bits comprised in the K first field(s) and the K second field(s), or a position(positions) of frequency-domain resources occupied by the second radio signal in frequency-domain resources occupied by the first radio signal.

* * * * *